(12) United States Patent
Edelkhani et al.

(10) Patent No.: US 11,803,172 B2
(45) Date of Patent: Oct. 31, 2023

(54) EFFICIENT SELECTION OF EXPERIMENTS FOR ENHANCING PERFORMANCE IN CONTROLLED ENVIRONMENT AGRICULTURE

(71) Applicant: MJNN LLC, South San Francisco, CA (US)

(72) Inventors: Nima Edelkhani, Menlo Park, CA (US); Ruvan C. Jayaweera, Fremont, CA (US); A. Samuel Pottinger, Emeryville, CA (US); Zachary Duncan Swafford, Woodside, CA (US)

(73) Assignee: MJNN LLC

( * ) Notice: Subject to any disclaimer, the term of this patent is extended or adjusted under 35 U.S.C. 154(b) by 403 days.

(21) Appl. No.: 16/869,217

(22) Filed: May 7, 2020

(65) Prior Publication Data

US 2020/0356078 A1 Nov. 12, 2020

Related U.S. Application Data

(60) Provisional application No. 62/846,125, filed on May 10, 2019.

(51) Int. Cl.
*G05B 19/4155* (2006.01)
*A01G 7/04* (2006.01)
*A01G 31/00* (2018.01)
*A01G 7/02* (2006.01)

(52) U.S. Cl.
CPC ......... *G05B 19/4155* (2013.01); *A01G 7/02* (2013.01); *A01G 7/045* (2013.01); *A01G 31/00* (2013.01); *G05B 2219/45017* (2013.01)

(58) Field of Classification Search
None
See application file for complete search history.

(56) References Cited

U.S. PATENT DOCUMENTS

| | | |
|---|---|---|
| 4,015,366 A | 4/1977 | Hall, III |
| RE31,023 E | 9/1982 | Hall, III |
| 4,569,150 A | 2/1986 | Carlson et al. |
| 4,926,585 A | 5/1990 | Dreschel |
| 4,992,942 A | 2/1991 | Bauerle et al. |
| 5,841,883 A | 11/1998 | Kono et al. |
| 6,065,245 A | 5/2000 | Seawright |

(Continued)

FOREIGN PATENT DOCUMENTS

CN 103020731 B * 9/2015

OTHER PUBLICATIONS

Dai et al., "Parameter optimization for growth model of greenhouse crop using genetic algorithms", Feb. 2008, Applied Soft Computing 9, pp. 13-19 (Year: 2008).*

(Continued)

*Primary Examiner* — Mohammad Ali
*Assistant Examiner* — David Earl Ogg
(74) *Attorney, Agent, or Firm* — Almanac IP Advisors LLP

(57) ABSTRACT

Systems, methods, and computer-readable media are provided for determining treatments to apply to plants within control volumes having controlled agricultural environments. Each treatment comprises application of a set of setpoints, choosing a reproduction operation for the treatment, and selecting one or more previous sets from setpoints from one or more previously applied treatments, for use with the chosen reproduction operation.

33 Claims, 13 Drawing Sheets

(56) References Cited

U.S. PATENT DOCUMENTS

| | | | |
|---|---|---|---|
| 7,617,057 | B2 | 11/2009 | May et al. |
| 7,987,632 | B2 | 8/2011 | May et al. |
| 9,030,549 | B2 | 5/2015 | Redden |
| 9,064,173 | B2 | 6/2015 | Redden |
| 9,095,554 | B2 | 8/2015 | Lewis et al. |
| 9,370,164 | B2 | 6/2016 | Lewis et al. |
| 9,565,812 | B2 | 2/2017 | Wilson |
| 9,642,317 | B2 | 5/2017 | Lewis et al. |
| 9,658,201 | B2 | 5/2017 | Redden et al. |
| 9,717,171 | B2 | 8/2017 | Redden et al. |
| 9,756,771 | B2 | 9/2017 | Redden |
| 9,785,886 | B1 | 10/2017 | Andoni et al. |
| 9,955,552 | B2 | 4/2018 | Ashdown et al. |
| 10,008,035 | B1 | 6/2018 | Redden et al. |
| 2004/0194371 | A1 | 10/2004 | Kinnis |
| 2006/0230006 | A1* | 10/2006 | Buscema ............ G06N 3/0454 706/13 |
| 2007/0208677 | A1* | 9/2007 | Goldberg ............ G06N 3/126 706/13 |
| 2007/0282666 | A1* | 12/2007 | Afeyan ............ G06Q 10/101 706/13 |
| 2008/0148630 | A1 | 6/2008 | Ryan et al. |
| 2009/0199470 | A1 | 8/2009 | Capen et al. |
| 2012/0277117 | A1 | 11/2012 | Zayed et al. |
| 2013/0174040 | A1* | 7/2013 | Johnson ............ G06Q 10/06 715/733 |
| 2014/0298511 | A1 | 10/2014 | Lewis et al. |
| 2014/0366443 | A1* | 12/2014 | Brusatore ............ A01G 9/02 47/65.5 |
| 2015/0027040 | A1 | 1/2015 | Redden |
| 2015/0027041 | A1 | 1/2015 | Redden |
| 2015/0027043 | A1 | 1/2015 | Redden |
| 2015/0027044 | A1 | 1/2015 | Redden |
| 2015/0366154 | A1 | 12/2015 | Lewis et al. |
| 2016/0000020 | A1 | 1/2016 | Sugimoto |
| 2016/0057922 | A1* | 3/2016 | Freiberg ............ A01B 79/005 703/11 |
| 2016/0148104 | A1 | 5/2016 | Itzhaky et al. |
| 2016/0255778 | A1 | 9/2016 | Redden et al. |
| 2017/0039425 | A1 | 2/2017 | Itzhaky et al. |
| 2017/0105358 | A1 | 4/2017 | Wilson |
| 2017/0146226 | A1 | 5/2017 | Storey et al. |
| 2017/0161560 | A1 | 6/2017 | Itzhaky et al. |
| 2017/0202170 | A1 | 7/2017 | Lewis et al. |
| 2017/0206415 | A1 | 7/2017 | Redden |
| 2017/0219711 | A1 | 8/2017 | Redden et al. |
| 2017/0223900 | A1* | 8/2017 | Jagyasi ............ A01G 22/00 |
| 2017/0290260 | A1 | 10/2017 | Redden et al. |
| 2017/0332544 | A1 | 11/2017 | Conrad et al. |
| 2018/0014471 | A1 | 1/2018 | Jensen et al. |
| 2018/0014485 | A1 | 1/2018 | Whitcher et al. |
| 2018/0014486 | A1 | 1/2018 | Creechley et al. |
| 2018/0064055 | A1 | 3/2018 | Lewis et al. |
| 2018/0116094 | A1 | 5/2018 | Redden |
| 2018/0206416 | A1 | 7/2018 | Zimmerman et al. |
| 2019/0026431 | A1* | 1/2019 | Grouchy ............ G16B 5/00 |
| 2019/0080243 | A1* | 3/2019 | David ............ G06N 3/0454 |
| 2019/0124855 | A1* | 5/2019 | Rowan ............ G06F 30/20 |
| 2019/0154713 | A1* | 5/2019 | Wales ............ G01N 31/00 |
| 2019/0327913 | A1* | 10/2019 | Chong ............ G05B 19/418 |

OTHER PUBLICATIONS

Shiffman, "The Nature of Code", 2012, The Magic Book Project, Chapter 9 (Year: 2012).*

"Sklearn.ensemble.AdaBoostClassifier." (http://lijiancheng0614.github.io/scikit-learn/modules/generated/sklearn.ensemble.AdaBoostClassifier.html) 2010-2016; 6 pages.

Hardaker, J.B, The Assignment Technique: Some Agricultural Applications of a Simple Optimizing Procedure, 12 pages.

Nvidia, GPU-Based Deep Learning Inference: A performance and Power Analysis, Nov. 2015, 12 pages.

PCT International Search Report and Written Opinion dated Jan. 28, 2020; in patent application No. PCT/US2019/055064, 9 pgs.

"Genetic Algorithm." Wikipedia, Wikimedia Foundation, Apr. 2, 2018, en.wikipedia.org/wiki/Genetic_algorithm#The_building_block_hypothesis; 17 pages.

Poorter et al. The art of growing plants for experimental purposes: a practical guide for the plant biologist; https://www.researchgate.net/publication/259928558; Nov. 2012; 19 pages.

Dahl et al., GPU-Based Deep Learning Inference: A Performance and Power Analysis, NVidia Whitepaper, Nov. 2015; 12 pages.

Murphy, Kevin, "A Brief Introduction to Reinforcement Learning." A Brief Introduction to Reinforcement Learning, University of British Columbia, 1998, www.cs.ubc.ca/~murphyk/Bayes/pomdp.html; 1 page.

Riddle Patricia J., "Genetic Algorithms." Computer Science 760, University of Auckland, 2012, www.cs.auckland.ac.nz/courses/compsci709s2c/lectures/Pat.d/760-GAs.pdf; 54 pages.

Shiffman Daniel, The Nature of Code, The Magic Book Project, Chapter 10, 2012; 40 pages.

Shiffman Daniel, The Nature of Code, The Magic Book Project, Chapter 9, 2012; 60 pages.

* cited by examiner

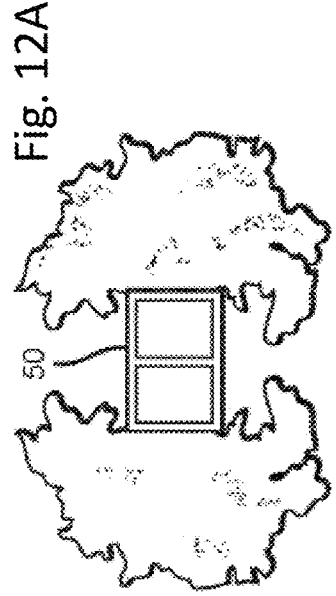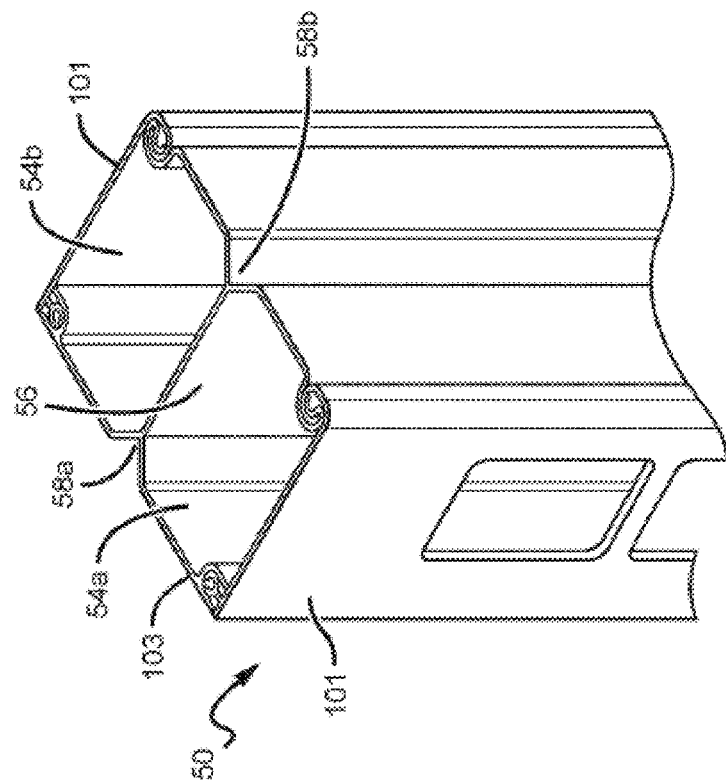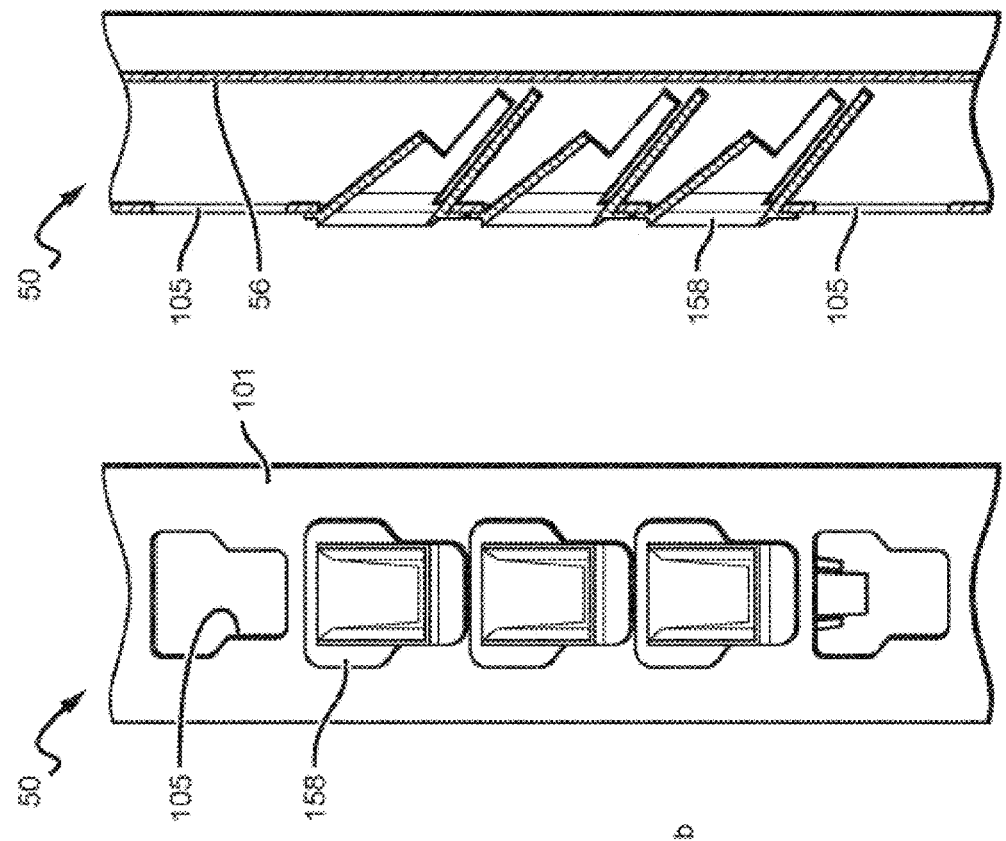
Fig. 12A
Fig. 12B
Fig. 12C
Fig. 12D

EFFICIENT SELECTION OF EXPERIMENTS FOR ENHANCING PERFORMANCE IN CONTROLLED ENVIRONMENT AGRICULTURE

CROSS-REFERENCE TO RELATED APPLICATIONS

This application claims the benefit of priority to U.S. Application No. 62/846,125, filed May 10, 2019, and is related to U.S. Patent Application Pub. No. 2018/0014486, filed Sep. 28, 2016. Both applications are assigned to the assignee of the present disclosure and incorporated by reference in their entirety herein.

FIELD OF THE DISCLOSURE

The disclosure relates generally to the field of controlled environment agriculture, and in particular to experiments for enhancing performance in controlled environment agriculture, and to reducing the number of experiments needed to achieve a desired performance.

BACKGROUND

During the twentieth century, agriculture slowly began to evolve from a conservative industry to a fast-moving high-tech industry in order to keep up with world food shortages, climate change, and societal changes. Farming began to move away from manually-implemented agricultural techniques toward computer-implemented technologies. In the past, and in many cases today, farmers only had one growing season to produce the crops that would determine their revenue and food production for the entire year. However, this is changing. With indoor growing as an option, and with better access to data processing technologies and other advanced techniques, the science of agriculture has become more agile. It is adapting and learning as new data is collected and insights are generated.

Advancements in technology are making it feasible to control the effects of nature with the advent of "controlled indoor agriculture," otherwise known as "controlled environment agriculture." Improved efficiencies in space utilization and lighting, a better understanding of hydroponics, aeroponics, and crop cycles, and advancements in environmental control systems have allowed humans to better recreate environments conducive for agriculture crop growth with the goals of greater yield per square foot, better nutrition and lower cost.

Technical Challenges

Many environmental factors affect the growth of plants. Particular sets of environmental factors perform better or worse against the goal of growing the best plants in the most economical and environmentally friendly way. However, with the refined control of many of the environmental factors that indoor agriculture allows, traditional processes are inadequate to efficiently and effectively determine the most optimal way to grow the desired crops.

Current agricultural experimentation primarily involves the manipulation of a small number of environmental conditions and an analysis of the result. However, with thirty or more variables that can all affect one another, experiments that manipulate all of the factors to try all of the different possible environments are intractably large and expensive. This is a particularly prominent issue in the agricultural domain because plants can take months or years to grow to the point where their quality can be assessed, meaning each iteration of experimentation takes a protracted period and a serious investment of resources.

It is desired to mitigate the problems inherent in existing experimentation and optimization strategies in indoor agricultural environments.

SUMMARY OF THE DISCLOSURE

Technical Solutions

Embodiments of the disclosure mitigate the problems with existing experimentation and optimization strategies in indoor agricultural environments by using machine learning to prioritize and schedule experimentation on an online, ongoing basis.

Embodiments of the disclosure prioritize and optimize environmental setpoints in indoor agriculture environments. Indoor agriculture both enables and requires much more specific and granular environment control than the traditional alternatives. To successfully capitalize on an indoor agriculture operation, Embodiments of the disclosure determine the environment parameters that optimize outcome for yield and product quality and minimize cost.

Embodiments of the disclosure accomplish these objectives, and in a more efficient and cost-effective way than the next best known prior alternative. This enables savings on startup and configuration costs, and ensures that ongoing capital and operating costs are kept, in the long term, to a minimum. In a high-capital, low-margin business like indoor agriculture, Embodiments of the disclosure find better environments, and find them faster than conventional techniques.

According to embodiments of the disclosure, human experimenters may define all of the possible environments, and reasonable bounds of exploration of those environments, for a given plant variety. According to embodiments of the disclosure, a genetic algorithm approach is employed to define the subset of all possible combinations of experimental treatments that would be most beneficial to explore further. According to embodiments of the disclosure, as results from experiments come in, the algorithm continually and constantly refines its understanding of the most optimal environmental treatments and conditions, and offers revised recommendations and avenues of inquiry based on these intermediate results.

In this way embodiments of the disclosure can greatly reduce the number of necessary treatments (and the associated time and cost) required to find the optimal environmental condition, which under a traditional exhaustive empirical study would take time and resources on the order of the total permutations of all environmental factors (see below). The inventors ran 75 trials (experiments) for a total of approximately 1200 treatments with approximately 14 different variables, each with 2-5 possible setpoints. This provided 1200 chances to find the overall best treatments in more than 5 million possible permutations of setpoints. As a result of employing the setpoints recommended by the algorithm of embodiments of the disclosure, the inventors observed a 124% increase in yield per square meter per day.

The inventors are unaware of any prior application of genetic algorithms to the problem of optimizing crop environments, or the application of online machine learning for experiment management. Traditionally the bounds, parameters, and goals of experiments are managed by humans. A notable technical improvement is that embodiments of the disclosure can execute on the overall goal of optimization within the hyper-dimensional environment space more quickly than humans can by picking either independent or exhaustive lines of inquiry.

Embodiments of the disclosure also embody a technical improvement over existing genetic algorithms in that embodiments of the disclosure do not require experimental trials ("organisms" in genetic algorithm terminology) to be bucketed into distinct generations. This is a practical impossibility in a real-life environment, but in general makes running any genetic algorithm less flexible. Thus, the ability to run staggered experiments in an "online" fashion, potentially of different durations, and generate new recommendations and insights immediately and asynchronously is a major improvement. Data is incorporated as soon as possible, and new data either strengthens or corrects old findings and optimizations. (In computer science, online machine learning is a method of machine learning in which data becomes dynamically available, in a sequential order, and is used to update the best predictor for future data at each step, as opposed to batch learning techniques which generate the best predictor by learning on the entire training data set at once.)

One further advantage of embodiments of the disclosure over conventional techniques is that it is better suited to handle real-world limitations and situations than most genetic algorithms. In many cases, such programs are applied in idealized environments. However, because this application is inherently real-world, embodiments of the disclosure are designed around the fact that different variables and variables have different scales of intended control, actual measurement, and ideal measurement. For example, the temperature in an indoor agricultural environment might be intended and set to be 27.1° C., but measured to be 27.4° C. because the control is imperfect, and actually 27.7° C. because the measurement is imperfect. Embodiments of the disclosure incorporate and handle all of these discrepancies by using actual measured values for fitness scores and recording the parameters of the actual treatment applied (rather than the parameters of the intended treatment) as the stored parameters of record of that treatment.

Some literature related to the problem space and implementation of embodiments of the disclosure include the following, all of which are incorporated by reference in their entirety herein:

Murphy, Kevin. "A Brief Introduction to Reinforcement Learning." *A Brief Introduction to Reinforcement Learning*, University of British Columbia, 1998, www.cs.ubc.ca/~murphyk/Bayes/pomdp.html.

Grey, C G P. "How Machines Learn." YouTube, Grey Industries, 18 Dec. 2017, www.youtube.com/watch?v=R9OHn5ZF4Uo.

Shiffman, Daniel. *The Nature of Code*. The Magic Book Project, 2012.

Riddle, Patricia J. "Genetic Algorithms." *Computer Science 760*, University of Auckland, 2012, www.cs.auckland.ac.nz/courses/compsci709s2c/lectures/Pat.d/760-GAs.pdf.

Systems, computer-implemented methods, and computer-readable media are provided for determining treatments to apply to one or more plants within each control volume of one or more control volumes having a controlled agricultural environment. Each treatment comprises application of a set of setpoints to a control volume. According to embodiments of the disclosure, each control volume includes one or more plants of the same variety.

The following discussion in this Summary section refers particularly to methods of embodiments of the disclosure. However, as would be recognized by those skilled in the art, other embodiments of the disclosure include systems and computer-readable media storing instructions for practicing the method of embodiments of the disclosure.

The method includes, for each control volume of the one or more control volumes during each iteration of a plurality of iterations: (a) choosing, from a plurality of reproduction operations, a reproduction operation for a treatment to be applied to the control volume; and (b) determining the treatment to be applied to the control volume based at least in part upon one or more previous sets of setpoints, for use with the reproduction operation chosen for the current iteration. The one or more previous sets of setpoints are selected from one or more previous treatments that were applied to the one or more control volumes (e.g., to all of the one or more control volumes). According to embodiments of the disclosure, determining a treatment comprises randomly selecting one or more previous sets of setpoints. The previous sets of setpoints may be based at least in part upon measured setpoint values.

According to embodiments of the disclosure, the treatments include one or more of light spectrum, light intensity, light duration, $CO_2$ concentration, air temperature, humidity, nutrient solution EC, or nutrient solution pH. Embodiments of the disclosure apply the determined treatment to the control volume.

Embodiments of the disclosure repeat a.-b. until a termination condition is satisfied. The termination condition may be based at least in part upon time, number of iterations, limit of one or more setpoints, fitness score variation limit, or attainment of a target fitness score. After a termination condition is reached, the determined treatment may be applied to a production control volume that is a plant grow space used for production purposes.

According to embodiments of the disclosure, the determined treatment for each iteration corresponds to a determined set of setpoints, of the one or more previous sets of setpoints, to be applied to the control volume, and the method repeats a.-b. to determine one or more first setpoints of the determined set of setpoints until a tier-level termination condition is satisfied for the one or more first setpoints, and thereafter repeats a.-b. to determine one or more second setpoints of the determined set of setpoints.

According to embodiments of the disclosure, determining a treatment is based at least in part upon one or more fitness scores of the one or more previous treatments. The one or more fitness scores may be based at least in part upon harvest weight, cost, plant quality or an energy-related metric. According to embodiments of the disclosure, determining a treatment comprises selecting one or more previous sets of setpoints from the one or more previous treatments that each has a corresponding fitness score that satisfies a fitness threshold. According to embodiments of the disclosure, determining a treatment comprises selecting one or more previous sets of setpoints from the one or more previous treatments based at least in part upon fitness proportionate selection.

Choosing a reproduction operation may comprise choosing a reproduction operation from a plurality of reproduction operations in proportion to a reproduction proportion. According to embodiments of the disclosure, for at least two subsequent iterations for a control volume, the method adjusts the reproduction proportion.

The chosen reproduction operation may comprise a replication operation or a modification operation, such as a crossover operation or a mutation operation. According to embodiments of the disclosure, the reproduction operation comprises a crossover operation and determining a treatment is based at least in part upon a genetic algorithm to select two of more previous sets of setpoints for the crossover operation.

According to embodiments of the disclosure, the chosen reproduction operation is a crossover operation, and determining a treatment comprises selecting at least two previous sets of setpoints based at least in part upon a probability of selection, $P_i$, wherein $P_i$ is based at least in part upon a square of a fitness score for the $i^{th}$ previous set of setpoints of a previous treatment.

According to embodiments of the disclosure, the chosen reproduction operation is a replication operation, and determining a treatment comprises selecting a previous set of setpoints from the previous treatments that each have a fitness score that satisfies a replication threshold. According to embodiments of the disclosure, for at least two subsequent iterations for a control volume, the method adjusts the replication threshold.

According to embodiments of the disclosure, the chosen reproduction operation is a modification operation, and determining a treatment comprises selecting previous sets of setpoints from the previous treatments that each have a fitness score that satisfies a modification threshold. According to embodiments of the disclosure, for at least two subsequent iterations for a control volume, the method adjusts the modification threshold.

According to embodiments of the disclosure, the determined treatment for each iteration corresponds to a determined set of setpoints, of the one or more previous sets of setpoints, to be applied to the control volume, one or more first setpoints of the determined set of setpoints are setpoints applicable to the control volume, and one or more second setpoints of the determined set of setpoints are setpoints applicable to one or more multi-plant support structures within the control volume but not to the entire control volume itself.

According to embodiments of the disclosure the start time of the $i^{th}$ iteration for one control volume does not necessarily coincide with the start time of the $i^{th}$ iteration for another control volume.

For the current iteration, embodiments of the disclosure choose a second reproduction operation from the plurality of reproduction operations to determine the treatment to be applied to the control volume.

The one or more control volumes may be grow spaces used for experimental purposes, and the determined treatment may be applied to at least one of the one or more control volumes.

According to embodiments of the disclosure, the one or more control volumes are grow spaces used for experimental purposes, and the determined treatment is applied to the one or more control volumes. According to embodiments of the disclosure, after a termination condition is reached, the determined treatment is applied to a second control volume that is a plant grow space used for production purposes.

BRIEF DESCRIPTION OF THE DRAWINGS

FIG. 12A is an end view of a grow tower having grow sites on opposing faces, according to embodiments of the disclosure.

FIG. 12B is a perspective view of a dual-sided grow tower, according to embodiments of the disclosure.

FIGS. 12C and 12D are front and a side cross-sectional views, respectively, of a grow tower having a plurality of receptacles for supporting plants.

DETAILED DESCRIPTION OF EMBODIMENTS OF THE DISCLOSURE

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the disclosed embodiments, but is to be accorded the widest scope consistent with the claims and the principles and features disclosed herein.

Figure 1:
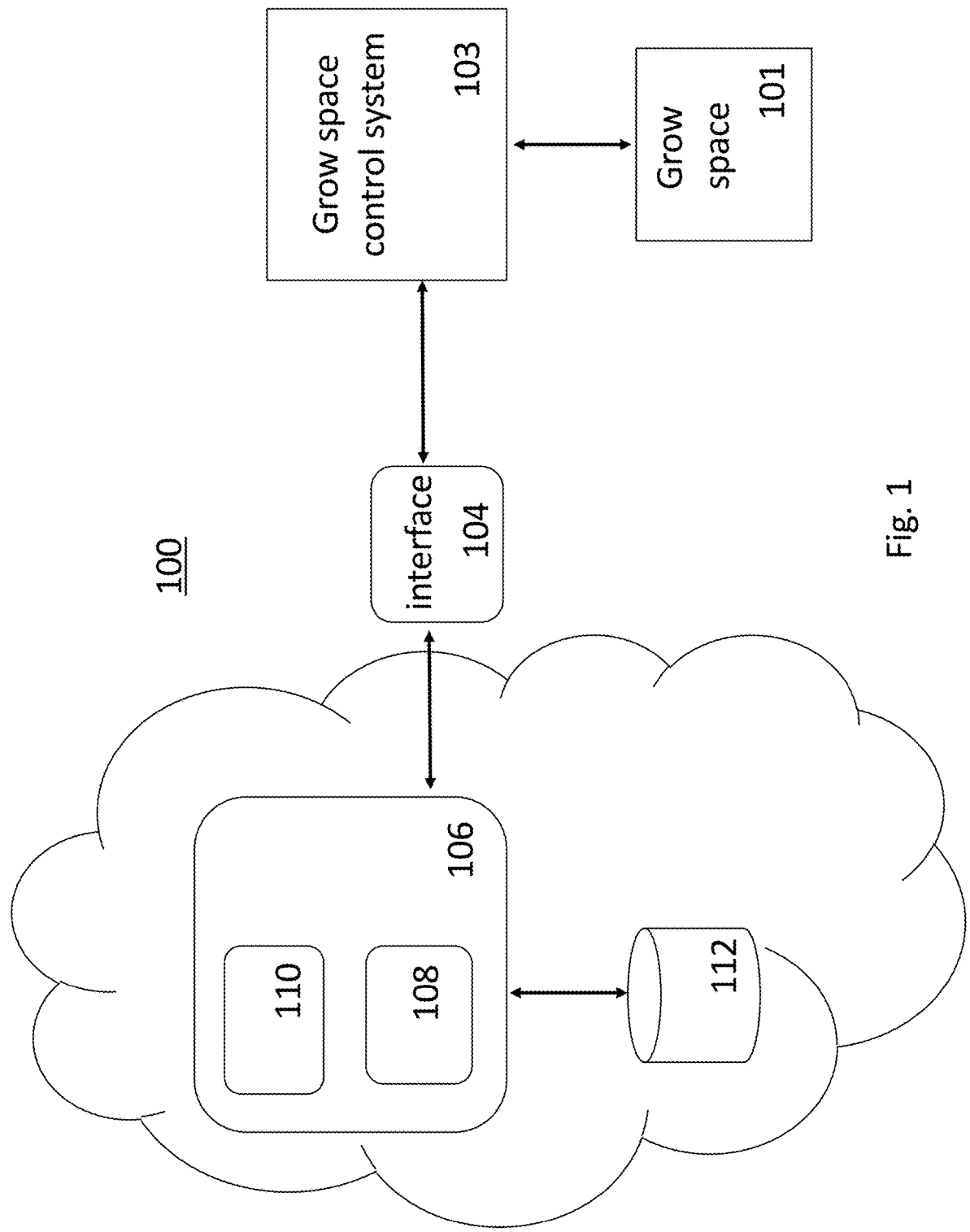
FIG. 1 illustrates a system for recommending and applying environmental treatments for one or more agricultural grow spaces, according to embodiments of the disclosure.

FIG. 1 illustrates a system 100 for recommending and applying environmental treatments for one or more agricultural grow spaces 101, according to embodiments of the disclosure. Each grow space is a controlled agricultural environment, and thus each grow space is alternatively referred to herein as a "control volume." The grow spaces each house multiple plants and can maintain a sealed environment. The system includes a grow space control system 103, an interface 104, and a recommendation engine 106 that includes a machine learning module 108, a fitness score generation module 110, and a database 112. The recommendation engine 106 and the database 112 may reside in a network cloud in relation to interface 104.

Figure 2:
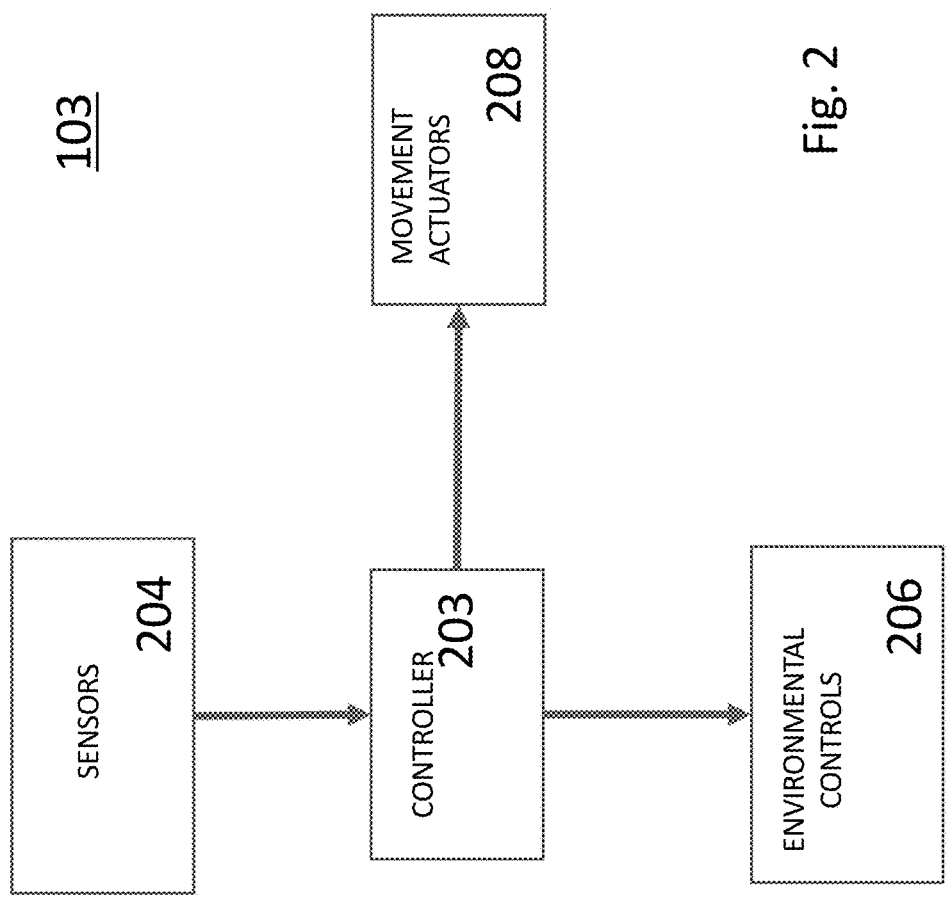
FIG. 2 is a diagram of the grow space control system for measuring and setting environmental conditions in the one or more grow spaces, according to embodiments of the disclosure.

FIG. 2 is a simplified diagram of the grow space control system 103 for measuring and setting environmental conditions in the one or more grow spaces 101, according to embodiments of the disclosure. The control system 103 includes a controller 203, sensors 204, environmental controls 206, and movement actuators 208. According to embodiments of the disclosure, the movement actuators may move receptacles holding plants and move structures, such as towers, that support the receptacles. Such structures are described in U.S. Patent Application Pub. Nos. 2018/0014486 and US 2017/0146226, incorporated by reference in their entirety herein. The controller 203 may be implemented using programmed logic, such as a computer, a microcontroller, or an ASIC. The sensors 204 may include sensors that sense environmental conditions such as temperature; humidity; air flow; $CO_2$; water flow; pH, EC, DO, and nutrient levels of irrigation water; and light intensity, spectrum, and schedule.

Figure 3:
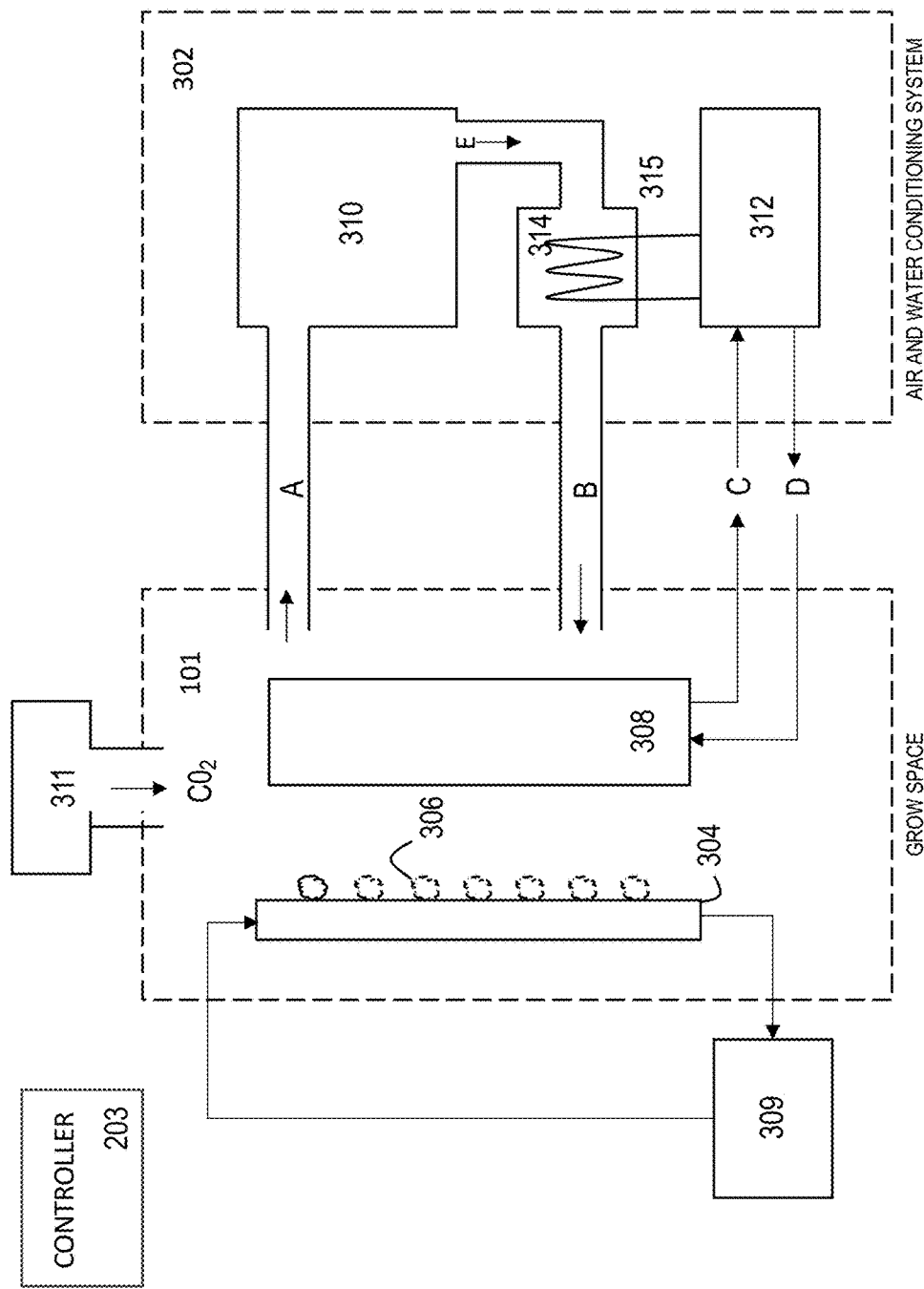
FIG. 3 illustrates a plant growing environment and an environmental conditioning system for conditioning air and fluid for the grow space, according to embodiments of the disclosure.

FIG. 3 illustrates a plant growing environment 101 and an environmental conditioning system 302 for conditioning air and fluid (e.g., water) for the grow space 101, according to embodiments of the disclosure. The plant growing environment 101 includes at least one multi-plant support structure 304 (such as a tower) having receptacles, for holding plants 306, and a fluid-cooled light fixture 308, according to embodiments of the disclosure.

An irrigation pump 309 circulates water and nutrients through the plant support structure 304. Carbon dioxide supply equipment 311 provides carbon dioxide to the plants. The irrigation pump 309 and carbon dioxide supply equipment 311 may be considered as part of the conditioning system 302, according to embodiments of the disclosure.

According to embodiments of the disclosure, the conditioning system 302 includes a dehumidifier 310, a fluid (e.g., water) conditioning system 312, and a heating coil 314 in heat exchanger 315. The dehumidifier 310 receives return air A from the grow space 101. The conditioning system 302 provides supply air B, having a temperature and relative humidity that is controlled to meet setpoints for desired operating conditions of the plants in the environment 101.

The fluid conditioning system 312 receives return fluid C from a fluid-cooled light fixture 308, according to embodiments of the disclosure. The fluid conditioning system 312 can control the fluid temperature by varying the fluid flow rate through the light fixtures 308. The fluid conditioning system 312 supplies to the fluid-cooled light fixture 308 a supply fluid D, having a temperature that is controlled to meet set points for desired operating conditions of the plants in the environment 600.

According to embodiments of the disclosure, waste heat from the fluid passing through fluid conditioning system 312 may be provided to the heating coil 314 in the heat exchanger 315 to heat air E that is output from the dehumidifier 310. The air heated by the coil 314 is output as heated air B to the grow space 101.

The controller 203 may control all the elements of the conditioning system 302, according to embodiments of the disclosure. The controller 203 may receive sensed parameters from sensors distributed throughout the plant growing environment 101 and the air and water conditioning system 302, according to embodiments of the disclosure. Such sensors may include, for example, sensors that measure temperature, humidity, soil moisture, plant characteristics (e.g., size, shape, color), and irrigation flow rate. The controller 203 may also receive operating settings for those same parameters as well as others. The controller 203 may use the sensed parameters as feedback to instruct the conditioning system 302 to control environmental treatments (e.g., temperature, humidity) of the plant growing environment 101, according to embodiments of the disclosure.

Grow Space

Figure 4B:
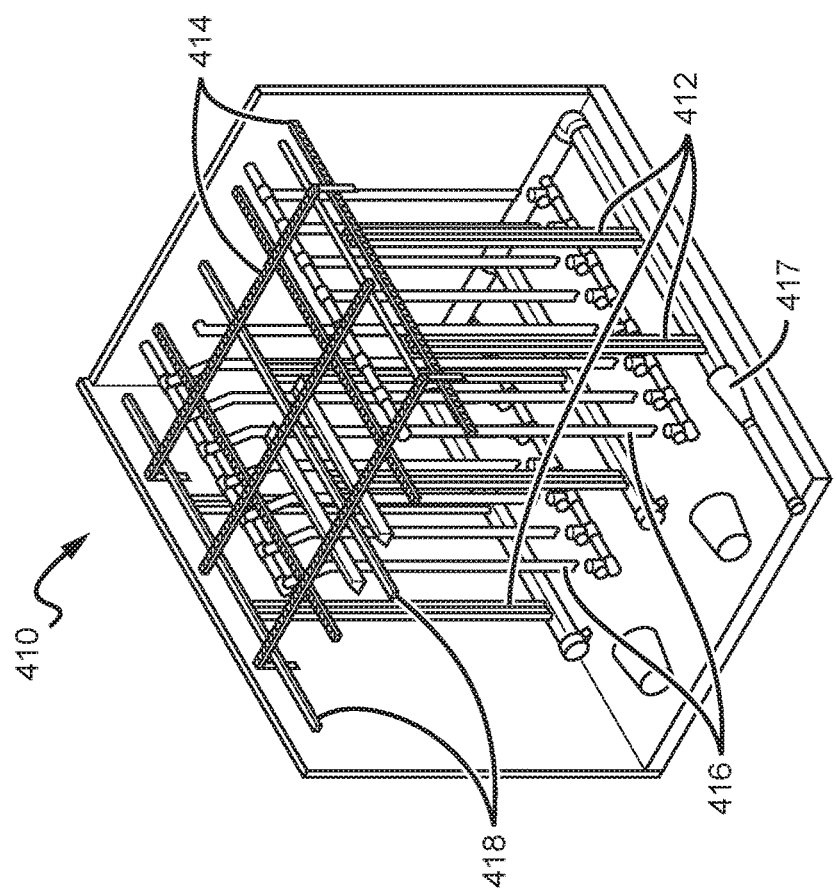
FIG. 4B is an interior view of a pod that includes multiple vertical grow towers, according to embodiments of the disclosure.
Figure 4A:
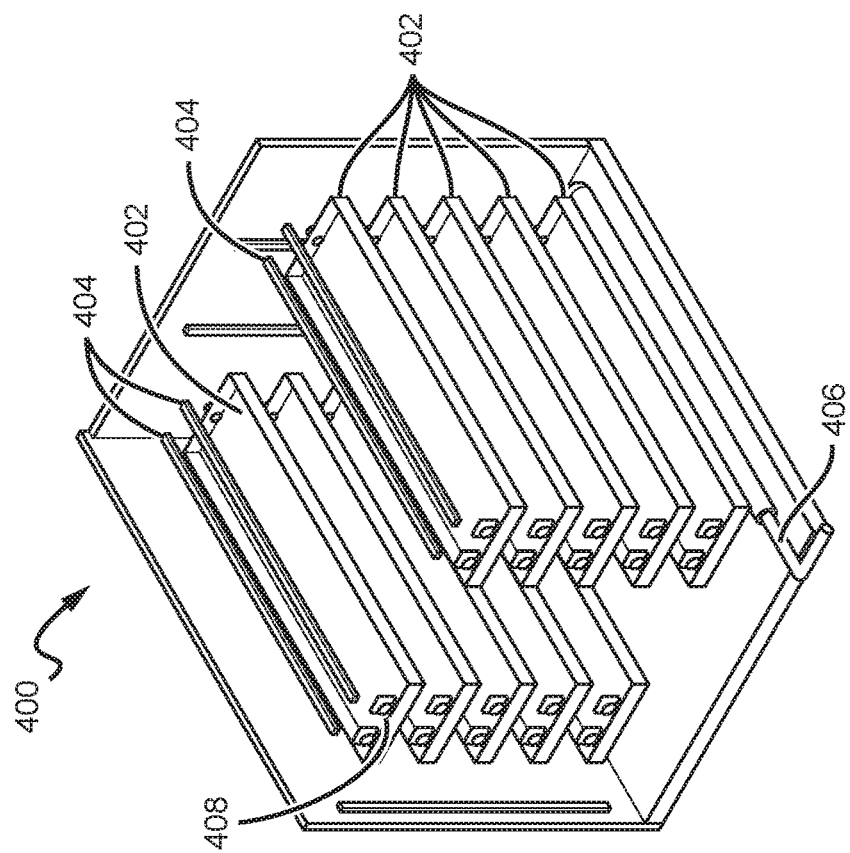
FIG. 4A is an interior view of a pod that includes multiple hydroponic flood tables, according to embodiments of the disclosure.

The grow space 101, especially when used for experiments to determine treatments, may be referred to herein as a "pod." FIG. 4A is a simplified interior view of a pod 400 that includes multiple hydroponic flood tables 402, according to embodiments of the disclosure. Lighting bars 404 provide light to plants supported in the tables 402. Drain pipes 406 provide drainage of water from the tables 402. Supply pipes 408 provide nutrient-filled fluid to the towers.

FIG. 4B is a simplified interior view of a pod 410 that includes multiple vertical grow towers 412. Vertical towers 412 hang from an upper support 414. Lighting bars 416 provide light to plants supported in the towers 412. Drain pipes 417 provide drainage of water from the towers. Supply pipes 418 provide nutrient-filled fluid to the towers 412.

As one example of the type of pod shown in FIG. 4B, pod dimensions may be 2.43 m wide×3.05 m long×2.43 m high, with the interior of the pod containing four rows of 16 towers, each tower with 37 plant sites, making each pod capable of growing 2,368 plants.

Exemplary Indoor Agricultural System

The following describes a vertical farm production system configured for high density growth and crop yield. Although embodiments of the disclosure will primarily be described in the context of a vertical farm in which plants are grown in towers, those skilled in the art will recognize that the principles described herein are not limited to a vertical farm or the use of grow towers, but rather apply to plants grown in any structural arrangement.

Figure 9:
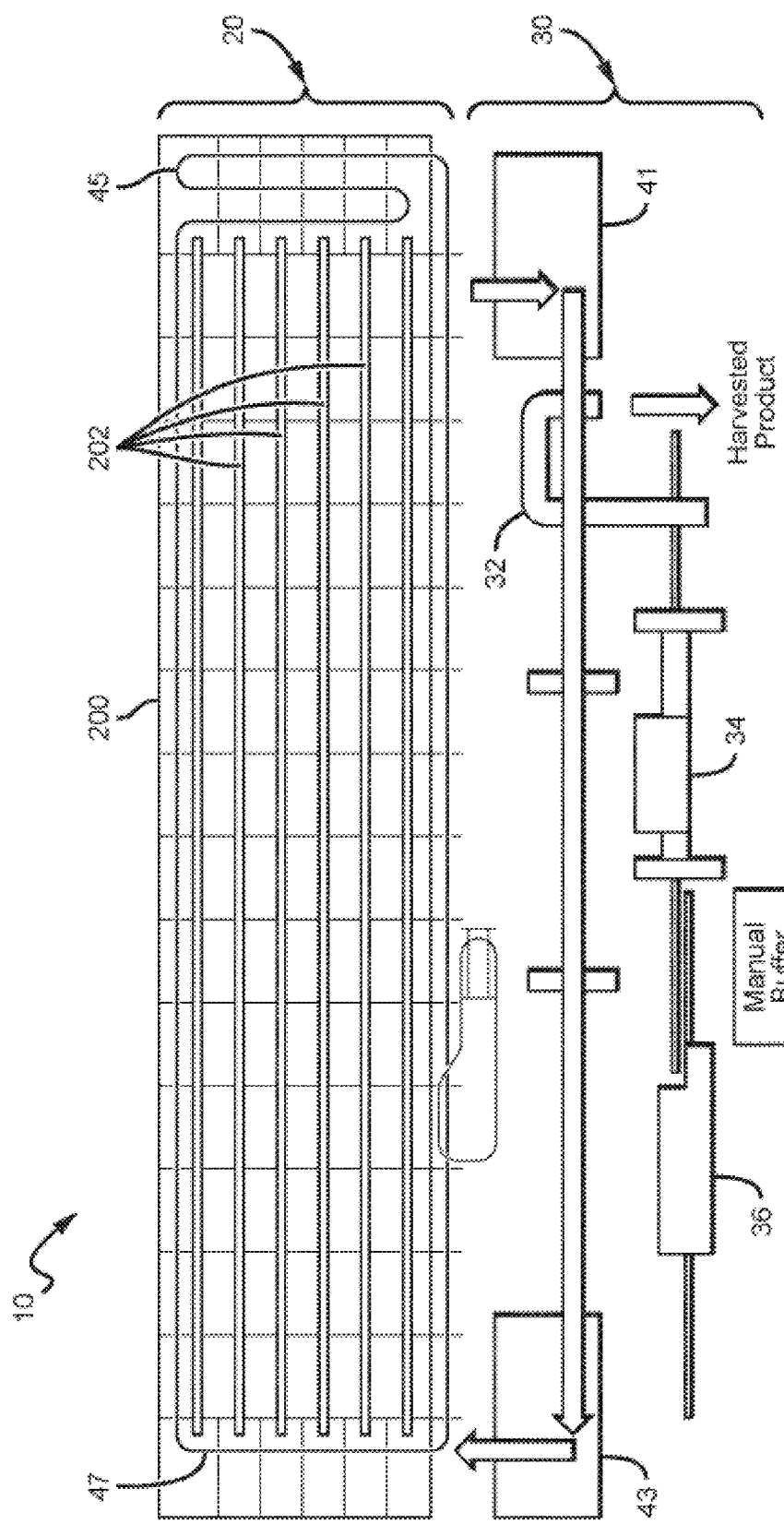
FIGS. 9 and 10 illustrate a controlled environment agriculture system, according to embodiments of the disclosure.
Figure 10:
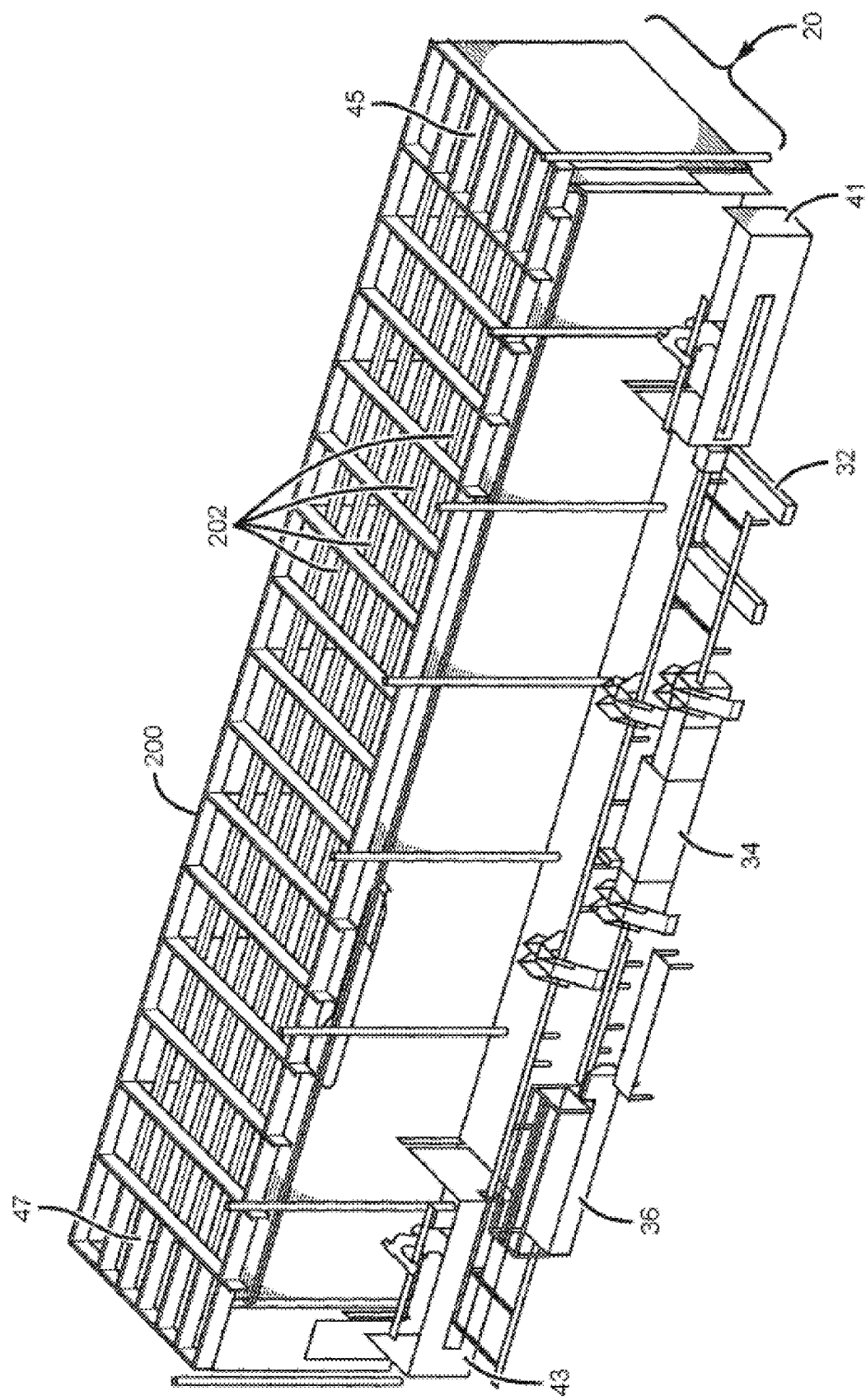

FIGS. 9 and 10 illustrate a controlled environment agriculture system 10, according to embodiments of the disclosure. At a high level, the system 10 may include an environmentally-controlled growing chamber 20, a vertical tower conveyance system 200 that is disposed within the growing chamber 20 and configured to convey vertical grow towers with crops disposed therein, and a central processing facility 30. The plant varieties that may be grown may be gravitropic/geotropic, phototropic, hydroponic, or some combination thereof. The varieties may vary considerably and include various leaf vegetables, fruiting vegetables, flowering crops, fruits, and the like. The controlled environment agriculture system 10 may be configured to grow a single crop type at a time or to grow multiple crop types concurrently.

The system 10 may also include conveyance systems for moving the grow towers in a circuit throughout the crop's growth cycle. The circuit comprises a staging area configured to load the grow towers into and out of the vertical tower conveyance mechanism 200. The central processing system 30 may include one or more conveyance mechanisms for directing grow towers to stations in the central processing system 30, e.g., stations for loading plants into, and harvesting crops from, the grow towers. The vertical tower conveyance system 200 is configured to support and translate one or more grow towers 50 along grow lines 202. According to embodiments of the disclosure, the grow towers 50 hang from the grow lines 202.

Each grow tower 50 is configured to contain plant growth media that supports a root structure of at least one crop plant growing therein. Each grow tower 50 is also configured to releasably attach to a grow line 202 in a vertical orientation and move along the grow line 202 during a growth phase.

Together, the vertical tower conveyance mechanism 200 and the central processing system 30 (including associated conveyance mechanisms) can be arranged in a production circuit under control of one or more computing systems.

Figures 11A, 11B:
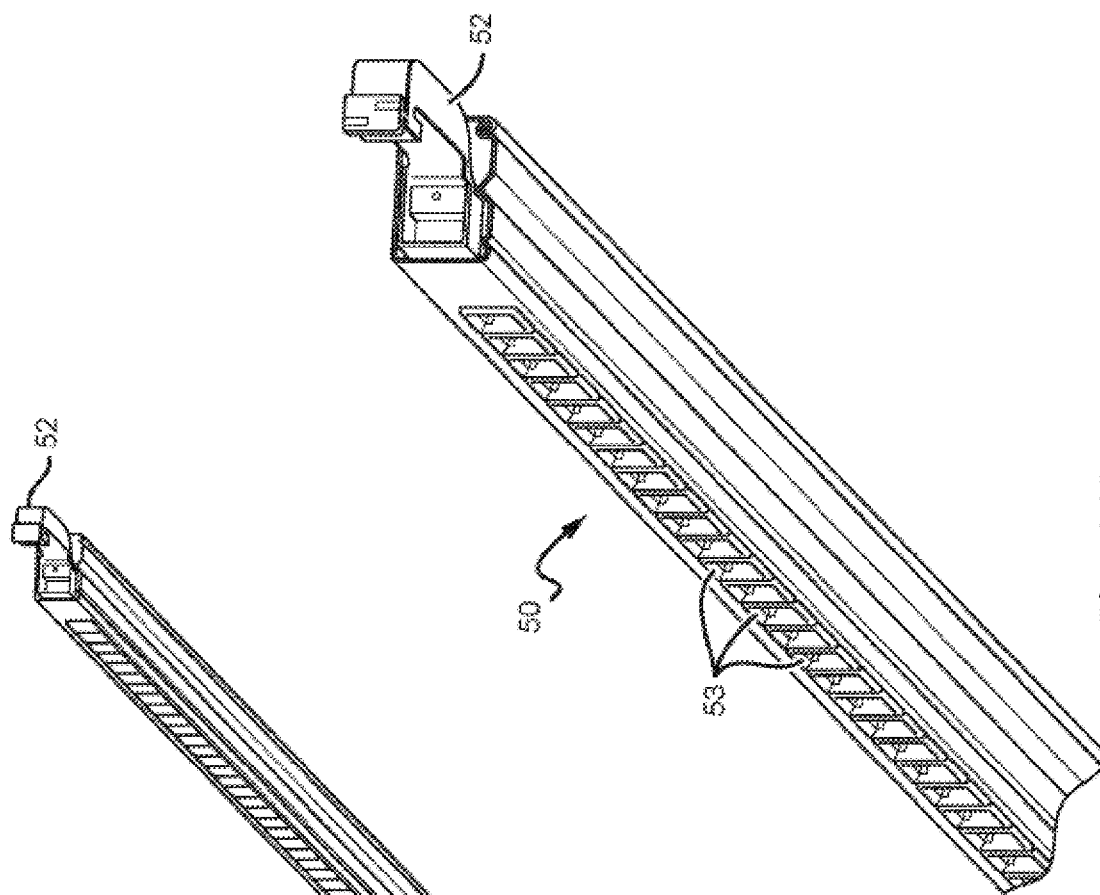
FIGS. 11A and 11B illustrate perspective views of a grow tower, according to embodiments of the disclosure.

Grow towers 50 provide the sites for individual crops to grow in the system. As FIGS. 11A and 11B illustrate, a tower 50 includes a hook 52 at the top. Hook 52 allows grow tower 50 to be supported by a grow line 202 when it is inserted into the vertical tower conveyance system 200. In one implementation, a grow tower 50 measures 5.172 meters long, where the extruded length of the tower is 5.0 meters, and the hook is 0.172 meters long. The extruded rectangular profile of the grow tower 50, in one implementation, measures 57 mm×93 mm (2.25"×3.67"). The hook 52 can be designed such that its exterior overall dimensions are not greater than the extruded profile of the grow tower 50.

Grow towers 50 may include a set of grow sites 53 arrayed along at least one face of the grow tower 50. In the implementation shown in FIG. 12A, grow towers 50 include grow sites 53 on opposing faces such that plants protrude from opposing sides of the grow tower 50. Transplanter station 36 may transplant seedlings into empty grow sites 53 of grow towers 50, where they remain in place until they are fully mature and ready to be harvested. In one implementation, the orientation of the grow sites 53 are perpendicular to the direction of travel of the grow towers 50 along grow line 202. In other words, when a grow tower 50 is inserted into a grow line 202, plants extend from opposing faces of the grow tower 50, where the opposing faces are parallel to the direction of travel. Although a dual-sided configuration is preferred, the invention may also be utilized in a single-sided configuration where plants grow along a single face of a grow tower 50.

Grow towers 50 may each comprise three extrusions which snap together to form one structure. FIG. 12B provides a perspective view of an exemplary dual-sided, multi-piece hydroponic grow tower 50 in which each front face plate 101 is hingeably coupled to the tower body 103. As shown in FIGS. 12A and 12B, the grow tower 50 may be a dual-sided hydroponic tower, where the tower body 103 includes a central wall 56 that defines a first tower cavity 54a and a second tower cavity 54b. In FIG. 12B, each front face plate 101 is in the closed position. The cross-section of the tower cavities 54a, 54b may be in the range of 1.5 inches by 1.5 inches to 3 inches by 3 inches, where the term "tower cavity" refers to the region within the body of the tower and behind the tower face plate. The wall thickness of the grow towers 50 maybe within the range of 0.065 to 0.075 inches. A dual-sided hydroponic tower, such as that shown in FIGS. 12A and 12B, has two back-to-back cavities 54a and 54b, each of which may be within the noted size range. In the configuration shown, the grow tower 50 may include (i) a first V-shaped groove 58a running along the length of a first side of the tower body 103, where the first V-shaped groove is centered between the first tower cavity and the second tower cavity; and (ii) a second V-shaped groove 58b running along the length of a second side of the tower body 103, where the second V-shaped groove is centered between the first tower cavity and the second tower cavity. The V-shaped grooves 58a, 58b may facilitate registration, alignment and/or feeding of the towers 50 by one or more of the stations in central processing system 30. Another attribute of V-shaped grooves 58a, 58b is that they effectively narrow the central wall 56 to promote the flow of aqueous nutrient solution centrally where the plant's roots are located.

As FIGS. 12C and 12D illustrate, grow towers 50 may each include a plurality of receptacles 105, for example cut-outs 105 as shown, for use with a compatible growth module 158, such as a plug holder. Each plug holder holds a plant of a given variety. Plug holder 158 may be ultrasonically welded, bonded, or otherwise attached to tower face 101. As shown, the growth modules 158 may be oriented at a 45-degree angle relative to the front face plate 101 and the vertical axis of the grow tower 50. It should be understood, however, that tower design disclosed in the present application is not limited to use with a particular plug holder or orientation; rather, the towers disclosed herein may be used with any suitably sized and/or oriented growth module. As such, cut-outs 105 are only meant to illustrate, not limit, the present tower design and it should be understood that embodiments may employ towers with other receptacle designs. In general, the receptacles may be part of any receptacle support structure (not just towers) for supporting plants within the grow space. For example, the receptacles may be laid out in rows and columns in a horizontal plane. The receptacle support may comprise a member (e.g., a tray, a table, an arm) holding multiple receptacles in a longitudinal (e.g., row) direction. The receptacles may be conveyed during their growth cycle in the longitudinal direction.

The growth environment 20 may include light emitting sources positioned at various locations between and along the grow lines 202 of the vertical tower conveyance system 200. The light emitting sources can be positioned laterally relative to the grow towers 50 in the grow line 202 and configured to emit light toward the lateral faces of the grow towers 50, which include openings from which crops grow. The light emitting sources may be incorporated into a water-cooled, LED lighting system as described in U.S. Publ. No. 2017/0146226A1, the disclosure of which is incorporated by reference in its entirety herein. In such an embodiment, the LED lights may be arranged in a bar-like structure. The bar-like structure may be placed in a vertical orientation to emit light laterally to substantially the entire length of adjacent grow towers 50. Multiple light bar structures may be arranged in the growth environment 20 along and between the grow lines 202. Other lighting systems and configurations may be employed. For example, the light bars may be arranged horizontally between grow lines 202.

The growth environment 20 may also include a nutrient supply system configured to supply an aqueous crop nutrient solution to the crops as they translate through the growth chamber 20. The nutrient supply system may apply aqueous crop nutrient solution to the top of the grow towers 50. Gravity may cause the solution travel down the vertically-oriented grow tower 50 and through the length thereof to supply solution to the crops disposed along the length of the grow tower 50. The growth environment 20 may also include an airflow source that is configured to, when a tower is mounted to a grow line 202, direct airflow in the lateral growth direction of growth and through an under-canopy of the growing plant, so as to disturb the boundary layer of the under-canopy of the growing plant. In other implementations, airflow may come from the top of the canopy or orthogonal to the direction of plant growth. The growth environment 20 may also include a control system, and associated sensors, for regulating at least one growing condition, such as air temperature, airflow speed, relative air humidity, and ambient carbon dioxide gas content. The control system may for example include such sub-systems as HVAC units, chillers, fans and associated ducting and air handling equipment. Grow towers 50 may have identifying attributes (such as bar codes or RFID tags). The controlled environment agriculture system 10 may include corresponding sensors and programming logic for tracking the grow towers 50 during various stages of the farm production cycle or for controlling one or more conditions of the growth environment. The operation of control system and the length of time towers remain in the growth environment can vary considerably depending on a variety of factors, such as crop type and other factors.

The grow towers 50 with newly transplanted crops or seedlings are transferred from the central processing system 30 into the vertical tower conveyance system 200. Vertical tower conveyance system 200 moves the grow towers 50 along respective grow lines 202 in growth environment 20 in a controlled fashion. Crops disposed in grow towers 50 are exposed to the controlled conditions of the growth environment (e.g., light, temperature, humidity, air flow, aqueous nutrient supply, etc.). The control system is capable of automated adjustments to optimize growing conditions within the growth chamber 20 and make continuous improvements to various attributes, such as crop yields, visual appeal and nutrient content. In addition, US Patent Publication Nos. 2018/0014485 and 2018/0014486 (both of which are incorporated by reference in their entirety herein) describe application of machine learning and other operations to optimize grow conditions in a vertical farming system. In some implementations, environmental condition sensors may be disposed on grow towers 50 or at various locations in the growth environment 20. When crops are ready for harvesting, grow towers 50 with crops to be harvested are transferred from the vertical tower conveyance system 200 to the central processing system 30 for harvesting and other processing operations.

Central processing system 30 may include processing stations directed to injecting seedlings into towers 50, harvesting crops from towers 50, and cleaning towers 50 that have been harvested. Central processing system 30 may also include conveyance mechanisms that move towers 50 between such processing stations. For example, as FIG. 9 illustrates, central processing system 30 may include harvester station 32, washing station 34, and transplanter station 36. Harvester station 32 may deposit harvested crops into food-safe containers and may include a conveyance mechanism for conveying the containers to post-harvesting facilities (e.g., preparation, washing, packaging and storage) that are beyond the scope of this disclosure.

Controlled environment agriculture system 10 may also include one or more conveyance mechanisms for transferring grow towers 50 between growth environment 20 and central processing system 30. In the implementation shown, the stations of central processing system 30 operate on grow towers 50 in a horizontal orientation. In one implementation, an automated pickup (loading) station 43, and associated control logic, may be operative to releasably grasp a horizontal tower from a loading location, rotate the tower to a vertical orientation and attach the tower to a transfer station for insertion into a selected grow line 202 of the growth environment 20. On the other end of growth environment 20, automated laydown (unloading) station 41, and associated control logic, may be operative to releasably grasp and move a vertically oriented grow tower 50 from a buffer location, rotate the grow tower 50 to a horizontal orientation and place it on a conveyance system for loading into harvester station 32. In some implementations, if a grow tower 50 is rejected due to quality control concerns, the conveyance system may bypass the harvester station 32 and carry the grow tower to washing station 34 (or some other station). The automated laydown and pickup stations 41 and 43 may each comprise a six-degrees of freedom robotic arm, such as a FANUC robot. The stations 41 and 43 may also include end effectors for releasably grasping grow towers 50 at opposing ends.

Growth environment 20 may also include automated loading and unloading mechanisms for inserting grow towers 50 into selected grow lines 202 and unloading grow towers 50 from the grow lines 202. According to embodiments of the disclosure, a load transfer conveyance mechanism 47 may include a powered and free conveyor system that conveys carriages each loaded with a grow tower 50 from the automated pickup station 43 to a selected grow line 202. Vertical grow tower conveyance system 200 may include sensors (such as RFID or bar code sensors) to identify a given grow tower 50 and, under control logic, select a grow line 202 for the grow tower 50. The load transfer conveyance mechanism 47 may also include one or more linear actuators that pushes the grow tower 50 onto a grow line 202. Similarly, the unload transfer conveyance mechanism 45 may include one or more linear actuators that push or pull grow towers from a grow line 202 onto a carriage of another powered and free conveyor mechanism, which conveys the carriages from the grow line 202 to the automated laydown station 41.

Figure 13:
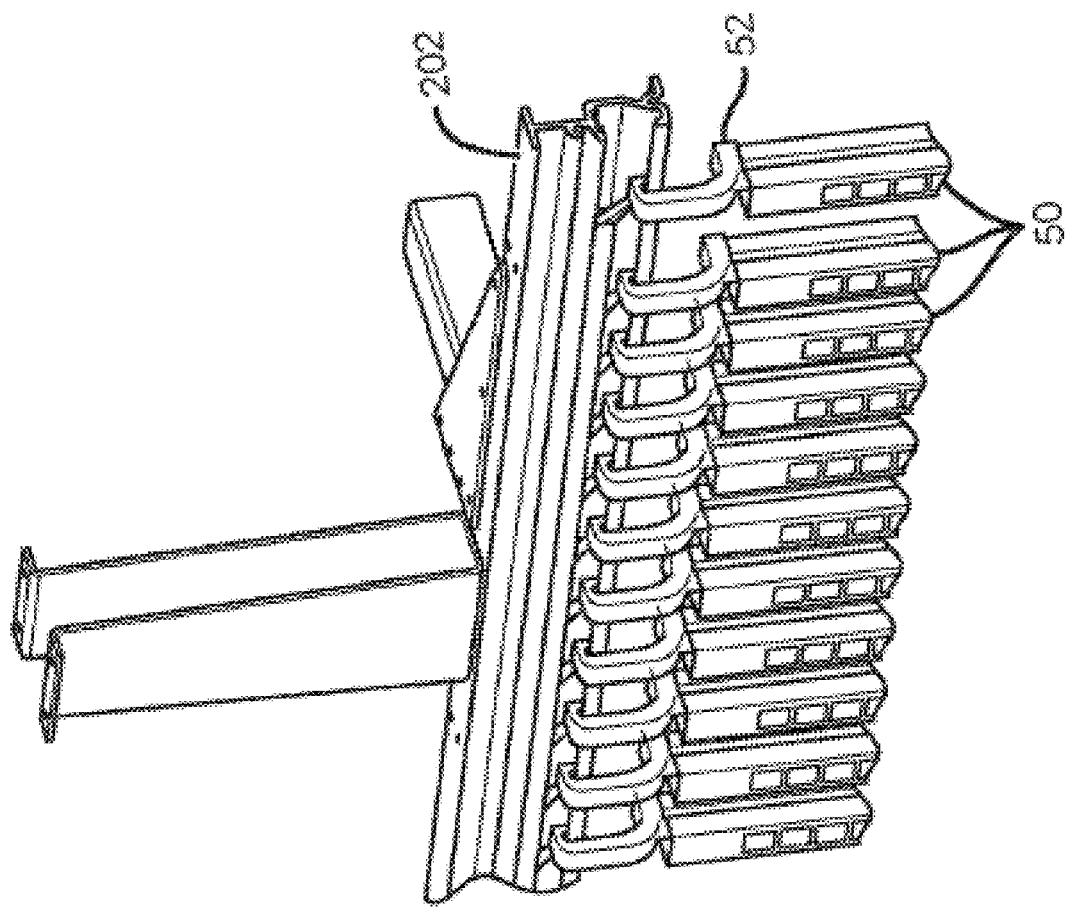
FIG. 13 illustrates a portion of a grow line in a vertical tower conveyance system, according to embodiments of the disclosure.

FIG. 13 illustrates a portion of a grow line 202 in the vertical tower conveyance system 200. According to embodiments of the disclosure, the vertical tower conveyance system 200 includes grow lines 202 arranged in parallel. Automated loading and unloading mechanisms 45, 47 may selectively load and unload grow towers 50 from a grow line 202 under automated control systems. As FIG. 13 shows, each grow line 202 supports a plurality of grow towers 50. In one implementation, a grow line 202 may be mounted to the ceiling (or other support) of the grow structure by a bracket for support purposes. Hook 52 hooks into, and attaches, a grow tower 50 to a grow line 202, thereby supporting the tower in a vertical orientation as it is translated through the vertical tower conveyance system 200. A conveyance mechanism moves towers 50 attached to respective grow lines 202.

Recommendation of Treatments to Apply to Grow Space(s)

Figure 7:
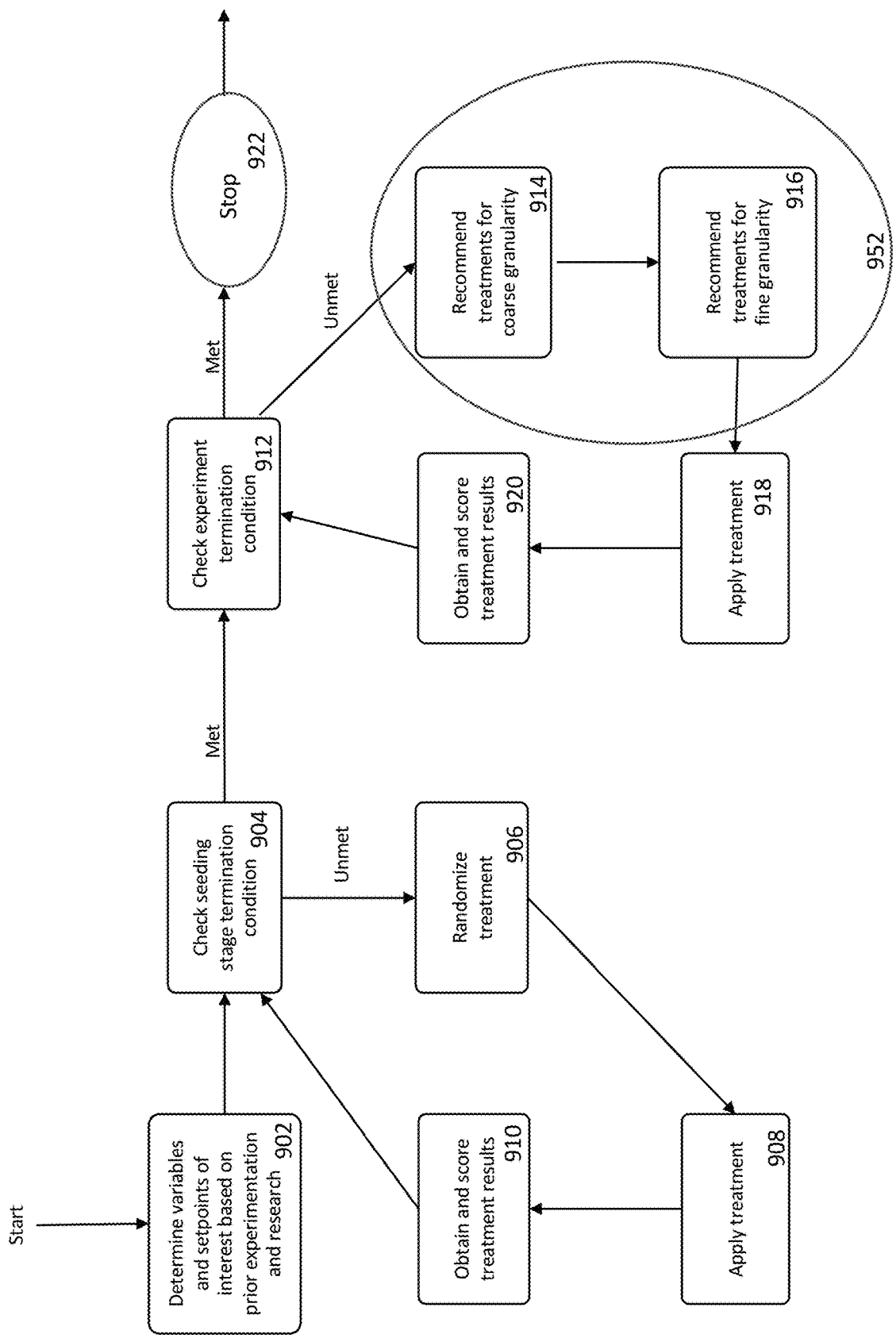
FIG. 7 is a flow diagram illustrating the determination and application of recommended treatments, according to embodiments of the disclosure.

Referring to FIG. 1, an experimenter using interface 104 (e.g., a graphical user interface) requests experimental treatment setpoint recommendations from recommendation engine 106, according to embodiments of the disclosure. Referring to FIG. 7, based on prior knowledge and experimentation, the recommendation engine 106 knows ranges for treatments (e.g., sets of setpoints for environmental conditions), to be applied to the plants in the grow space(s) 101, that are expected to yield satisfactory performance (e.g., harvest weight) (902), according to embodiments of the disclosure.

According to embodiments of the disclosure, temperature may be set to vary between day temperatures and night temperatures, which, according to experimental design, primarily range between 16-28° C. As an example, baseline setpoints for environmental conditions may be:

Temperature (Air): 22° C.—day; 18° C.—night
Light Intensity: 250 µmol/m$^2$/s
Light Duration: 18 hrs 'ON' (day cycle); 6 hrs 'OFF' (night cycle)
$CO_2$: 1200 ppm
Relative Humidity: 60%
EC: 1.75
pH: 5.8

According to embodiments of the disclosure, the engine 106 enters an initial, seeding stage for recommending experimental treatments. The engine 106 may check for a seeding stage termination condition (904), e.g., after the algorithm iterates for a predefined number of iterations (e.g., 100), or after approximately some percentage (e.g., 10%) of the total number of iterations if the total is known in advance. If the seeding stage is over, the engine 106 proceeds to recommending treatments according to a different process (see, e.g., steps 912, et seq.).

According to embodiments of the disclosure, if the seeding stage is not completed, the engine 106 randomly selects all or some of the environmental setpoints within the predefined ranges as a starting point (906). Alternatively, a human may select all or some of the initial setpoints. According to embodiments of the disclosure, random selections referred to herein may be performed using known techniques for generating pseudorandom numbers.

According to embodiments of the disclosure, the engine 106 may then instruct the grow space control system 103 to apply the selected setpoints as treatments to the grow space(s) 101 (908). According to embodiments of the disclosure, the engine 106 may then receive sensed conditions back from the grow space(s) 101 (assuming the grow space(s) 101 include plants of the same variety of interest) and use them to generate a fitness score with module 110 (if the fitness score is used to determine whether the seed stage termination condition is met) (910). The engine 106 then determines whether the seed stage termination condition is met, to determine whether to proceed to the next stage (904).

Figure 8:
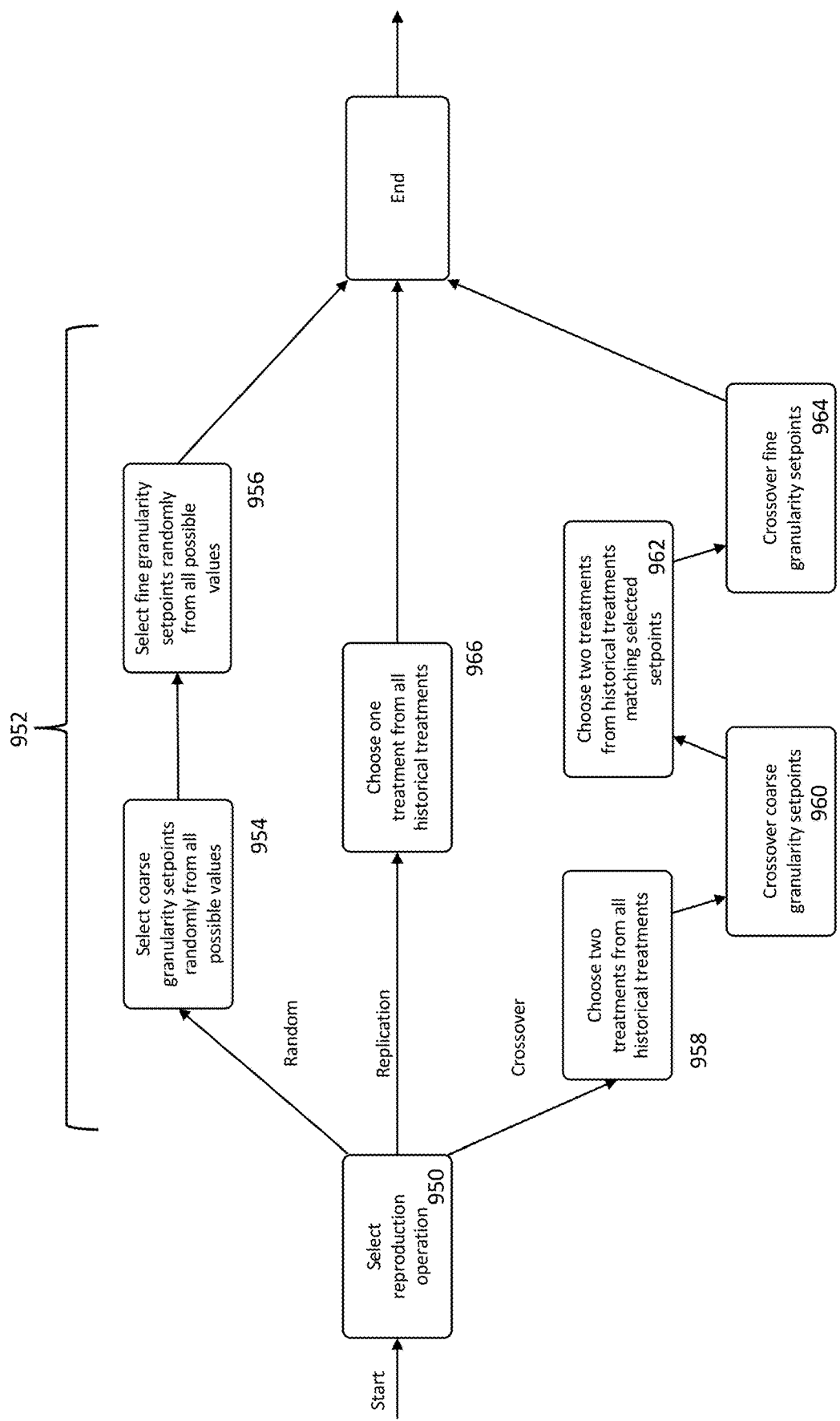
FIG. 8 is a flow diagram illustrating determination of a treatment, according to embodiments of the disclosure.

FIG. 8 illustrates determination of a treatment according to embodiments of the disclosure after the initial seeding stage. According to embodiments of the disclosure, the engine 106 chooses a reproduction operation (950) based upon, e.g., reproduction proportions that weight the likelihood that a particular reproduction operation will be chosen.

According to embodiments of the disclosure, the engine 106 queries a database 112 for information, including the setpoints or corresponding measured conditions, and experimental results for the previous iteration(s) (trial(s)) for each control volume 101 (e.g., pod). According to embodiments of the disclosure, based on that information, the scoring module 110 generates a fitness score for each previously applied treatment. As shown in FIG. 7, the engine 106 may using scoring module 110 to generate a fitness score for a treatment after it has been applied to a control volume (920).

According to embodiments of the disclosure, based on the fitness score(s), the machine learning module 108 selects one or more setpoints for the chosen reproduction operation to provide environmental treatment recommendations to the user interface 104 for the current iteration for each control volume 101 (952). (Note that mutation or random operations do not require knowledge of fitness score.)

According to embodiments of the disclosure, based on the recommendations, the experimenter may instruct the grow space control system 103 to apply the recommended setpoints to the control volume(s) in the grow space(s) 101 (918). For example, the control system 103 sets environmental setpoints such as temperature, air flow and humidity using an HVAC system, and also controls $CO_2$ concentration and nutrient flow in the control volume(s). According to embodiments of the disclosure, the control volume(s) to which the recommended treatments are applied contain the same plant variety as the control volume(s) for which the fitness scores were computed.

According to embodiments of the disclosure, instead of interposing a human experimenter to operate the grow space control system 103, the recommendation engine 106 may communicate instructions to the grow space control system 103 via, e.g., an application programming interface ("API").

Fitness Score

Via human or automated means, the results of a treatment are determined in order to compute the fitness score. For example, humans or robots in the grow space may harvest the plants in the treated control volumes to determine performance measures such as harvest weight. Humans may determine performance measures such as taste. Using known techniques to monitor electrical usage, a human operator or the controller 203 may determine energy consumption for one or more control volume(s), e.g., pod(s). Via human input into the interface 104 or automated input via means such as an API, the performance measures are sent to the engine 106. Using one or a combination of any of these performance measures (e.g., harvest weight, energy consumption) or other performance measures (e.g., cost), the scoring module 110 generates fitness scores for the corresponding control volumes (920).

According to embodiments of the disclosure, the scoring module 110 in the engine 106 scores the results of experiments using an objective function. The objective function may be based on a single metric or a weighted combination of metrics. One goal may be to maximize high quality yield and minimize cost. According to embodiments of the disclosure, the function may be average yield in kg per plant. According to embodiments of the disclosure, this metric can be scaled by a metric representing quality where higher values are better quality. This metric can be further modified by scaling commensurate with energy or cost, for example to create a metric as (saleable kg)/(kWh used) or (saleable kg)/(cost in $ of inputs).

According to embodiments of the disclosure, the former metric may be rendered as:

$$\text{score} = \text{quality factor} * \frac{\text{total final weight in kg of all plants in treatment}}{\text{total energy use in kWh of the treatment}}$$

where score is in a final unit of kg/kWh and the quality factor is a scalar in [0,1] representing the quality where 1 is perfect and 0 is entirely bad quality. Quality may be based on appearance, texture, and other subjective factors.

This score is a parameter of the problem space and is the metric around which the engine 106 optimizes. According to embodiments of the disclosure, the engine 106 can update the objective function without invalidating experimental data points as models improve. After updating the function, the engine 106 may score each data point again to reevaluate fitness. This update will also mean that any previous optimization and focus may have been in the wrong direction, but that is still better than continuing to optimize around the wrong metric.

After application of the environmental treatment to the control volume (grow space 101), the process iterates. According to embodiments of the disclosure, after an experimental treatment, sensors in the grow space feed back measured, sensed environmental conditions to the engine 106 and database 112, so that the recommendation engine 106 can correlate actual, measured environmental conditions (as opposed to instructed setpoints) to a fitness score generated by the scoring module 110. According to embodiments of the disclosure, the engine 106 records in database 112 the fitness scores along with the corresponding measured environmental conditions (and, optionally, the recommended/instructed setpoints) for use by the module 108 to generate a new set of recommended treatment setpoints for the next iteration.

One further advantage of embodiments of the disclosure over conventional techniques is that it is better suited to handle real-world limitations and situations than most optimization algorithms. In many cases, such programs are applied in idealized environments. However, because this application is inherently real-world, the engine 106 of embodiments of the disclosure is designed around the fact that different variables and values have different scales of intended control, actual measurement, and ideal measurement. For example, the temperature in an indoor agricultural environment might be intended and set to be 27.1° C., but measured to be 27.4° C. because the control is imperfect, and actually be 27.7° C. because the measurement is imperfect. As indicated above, the engine 106 of embodiments of the disclosure incorporates and handles all of these discrepancies by using actual measured values for fitness scores and recording the parameters of the actual treatment applied (rather than the parameters of the intended treatment) as the stored parameters of record of that treatment.

Improved Genetic Algorithm

According to embodiments of the disclosure, after ending the initial seeding stage, the engine 106 may employ the software module 108 to generate new recommendations using the finished experiments and their corresponding scores. According to embodiments of the disclosure, the module 108 employs a machine learning algorithm such as a genetic algorithm.

In general, genetic algorithms, following the analogy of evolution, generate new data points by treating past data points as "organisms" in a population. The score of each of these organisms represents their fitness, or likelihood of reproduction. Organisms with a higher fitness have a greater likelihood of having their variable choices, or "genes" (here, environmental setpoints), passed on to their descendants. Thus, as the algorithm continues, it is desired that selection process will converge on an optimum over multiple generations. Traditional genetic algorithms have discrete generations, with varying numbers of the population either continuing on to the next generation, getting mixed with other good solutions, randomized, or removed.

Embodiments of the disclosure differ from the conventional approach to genetic algorithms due to logistical and time concerns regarding waiting for an entire "generation" of agricultural experimental treatments to finish before being able to generate the next one. In a traditional experimentation paradigm: hypotheses are made; treatments are done in batches in the experiment; and results are analyzed. Future hypotheses and experiments are refined based on the results. According to embodiments of the disclosure, all of these steps can happen in parallel, and as soon as data are returned from a treatment, they are incorporated into the knowledge base. The engine 106 generates rolling, asynchronous recommendations ("online") to provide a dynamic recommendation based on a snapshot of the data available at the time.

To do so, according to embodiments of the disclosure, the ML module 108 treats every experimental treatment completed thus far as the sample space from which to draw. According to embodiments of the disclosure, with this modification to the conventional algorithm, module 108 generates recommendations for a new set of setpoints as follows:

According to embodiments of the disclosure, the engine 106 makes a random choice to decide the type of experimental treatment that will be generated. According to embodiments of the disclosure, the potential experimental treatments include the use of the following reproduction operations: replication (i.e., carry-forward), crossover, mutation, and random selection.

According to embodiments of the disclosure, during a replication operation, the module 106 carries over the same set of setpoints from one iteration to another (e.g., the next) iteration.

According to embodiments of the disclosure, during a crossover operation, the module 106 determines the setpoints for an iteration by combining one or more setpoints from a first set of setpoints from a previous iteration with one or more setpoints from a second set of setpoints from a previous iteration (e.g., the same previous iteration from which the first set of setpoints came). According to embodiments of the disclosure, the previous iteration from which the first and second sets are selected is the iteration in which those sets were most recently applied in a treatment. In short, reproduction through crossover enables construction of better solutions from the partial solutions of past samplings.

During a random operation, the module 108 generates a random set of setpoints within predefined ranges for each setpoint of the set, according to embodiments of the disclosure.

According to embodiments of the disclosure, the one or more control volumes are grow spaces used for experimental purposes (e.g., pods), and the grow space control system 103 applies the determined treatment to the one or more control volumes. According to embodiments of the disclosure, after a termination condition is reached to end all iterations for the experimental grow spaces (922), the grow space control system 103 applies the determined treatment to a second control volume that is a plant grow space used for production purposes.

Example

Step 1: Determine Fitness

According to embodiments of the disclosure, during each iteration for each control volume, the engine 106, using scoring module 110, determines a fitness score for a treatment (set of setpoints) that was previously applied (e.g., most recently applied) to one or more control volumes. According to embodiments of the disclosure, the fitness score is based at least in part upon an experimental response of one or more plants within the one or more control volumes to a treatment previously applied to the one or more control volumes. According to embodiments of the disclosure, the control volume may be a pod.

Referring to FIGS. 7 and 8, according to embodiments of the disclosure, the engine 106 determines whether the fitness score satisfies a termination condition (912). If the termination condition is satisfied, then the treatment determination stops (922). If the termination condition is not satisfied, then the engine 106 proceeds as follows.

Step 2: Choose Reproduction Operation (950)

Consider a scenario in which reproduction proportions for the reproduction operations are set as follows: 10% carry-forward (replication), 80% crossover, and 10% random. Based on those criteria, the engine 106 will select a replication operation 10% of the time, a crossover operation 80% of the time, and a random operation 10% of the time.

Step 3: Select Treatment Setpoints for the Selected Reproduction Operation(s) (952)

3a. According to embodiments of the disclosure, if the engine 106 selects a replication operation, then it determines the treatment to be applied by selecting (e.g., randomly selecting) a previous set of setpoints from previous treatments (966) that each have a corresponding fitness score exceeding a replication threshold. That is, the engine 106 may select a set of setpoints from the top $T_{rep}$% of previous sets of setpoints based on the fitness scores of the previous sets of setpoints, where $T_{rep}$ denotes the "replication threshold."

According to embodiments of the disclosure, the previous treatments from which a set(s) of setpoints is selected for a reproduction operation (e.g., replication, modification) may be the most recent previous treatment applied to one or more control volumes, all previous treatments for one or more control volumes (e.g., pods), all previous treatments for all control volumes, one or more previous treatments for a window of time or for a number of previous iterations, or some combination thereof.

3b. According to embodiments of the disclosure, if the engine 106 selects a modification operation (e.g., a crossover operation, a mutation operation, or both) then it determines the treatment to be applied by selecting (e.g., randomly selecting), for a crossover operation, two or more previous sets of setpoints (for a mutation, one previous setpoint set) from previous treatments (see 958-964) that each have a corresponding fitness score exceeding a fitness threshold. That is, the engine 106 may select the sets of setpoints from the top $T_{mod}$ % of previous sets of setpoints based on the fitness scores of the previous sets of setpoints, where $T_{mod}$ denotes the "modification threshold." (This example employs truncation selection, discussed elsewhere herein. Alternatively, the engine 106 may employ other embodiments disclosed herein, such as fitness proportionate ("roulette wheel") selection or the squared score approach.) According to embodiments of the disclosure, the engine 106 may combine truncation selection with fitness proportionate selection. For example, the engine 106 may select from previous treatments having a fitness score above a fitness threshold, and then select from the surviving treatments using fitness proportionate selection.

If, for example, the selected modification operation is crossover, the weighted gene pool (source of sets of setpoints) may be the top $T_{mod}$ % (80% in this example) of sets of setpoints in terms of the fitness scores of treatments previously applied, such as all treatments previously applied to all control volumes, according to embodiments of the disclosure.

According to embodiments of the disclosure, the modification threshold may equal the reproduction proportion for the crossover operation, which is 80% here.

According to embodiments of the disclosure, the engine 106 applies the modification operation to the selected sets of setpoints. According to embodiments of the disclosure, for a crossover modification operation, the engine 106 combines selected sets of setpoints. If, for example, each set of setpoints includes M setpoints, the engine 106 may combine K setpoints from a first selected set of setpoints for K environmental conditions (e.g., temperature, humidity) with M−K setpoints from a second selected set of setpoints for M−K environmental conditions (e.g., $CO_2$ concentration). In the case, M=3, the engine 106 may combine 2 setpoints from a first selected set of setpoints for 2 environmental conditions (e.g., temperature, humidity) with 1 setpoint from a second selected set of setpoints for 1 environmental condition (e.g., $CO_2$ concentration).

According to embodiments of the disclosure, for a modification operation implementing a mutation, the engine 106 randomly modifies one or more setpoints in the set of setpoints in a previous treatment. According to embodiments of the disclosure, there is a predefined, limited set of possible values that the setpoints can assume.

According to embodiments of the disclosure, the engine 106 may choose multiple reproduction operations to generate the treatment to be applied to the control volume during the current iteration. For example, the engine 106 may, based on the reproduction proportion, first choose a crossover operation to apply to the control volume(s), and select two or more previous sets of setpoints to which the crossover operation is applied. The engine 106 may also choose a second reproduction operation, such as a mutation, to be applied to the result of the crossover operation to determine the treatment for the current iteration. The selection of the second reproduction operation paired with the first reproduction operation may be based on a pre-set configuration or on the reproduction proportion. In total, this process produces one new set of setpoints for one treatment based on multiple operations.

3c. According to embodiments of the disclosure, if the engine 106 selects a random operation, then it determines the treatment to be applied by randomly (e.g., uniformly randomly) selecting a set of setpoints from treatments previously (e.g., most recently) applied to the control volume(s). Alternatively, according to embodiments of the disclosure, the engine 106 determines the treatment to be applied by randomly setting the setpoints within a set of setpoints within predefined ranges for each respective environmental condition (e.g., temperature, humidity) corresponding to the setpoints within set (954-956).

According to embodiments of the disclosure, the engine 106 repeats steps 1-3 until a termination condition is satisfied (912, 922).

Crossover Embodiments

Roulette Wheel Approach Fitness Proportionate Selection

According to embodiments of the disclosure, the chosen reproduction operation is a crossover operation, and the recommendation engine, via ML module 108, selects two or more sets of setpoints from a pool of setpoints using roulette wheel selection, otherwise known as "fitness proportionate selection." Under this approach, the scoring module 110 determines a fitness score for each treatment (set of setpoints). The engine 106 associates a probability of selection to each previously applied treatment setpoint set i, as follows:

$$P_i = \text{score}_i / (\Sigma^M_{j=1} \text{score}_j)$$

where $\text{score}_i$=fitness score for the application of the $i^{th}$ previous set of setpoints to the control volume, M is the number of setpoint sets in the control volume.

Based on these probabilities, the recommendation engine 106 selects the two or more setpoints to be combined in the crossover operation.

Truncated Selection

While candidate treatments with a higher fitness will less likely be eliminated with the roulette wheel approach, there is still a chance that they may not be selected because their probability of selection is less than 1 (or 100%). Contrast this with another embodiment of the disclosure that employs a simpler selection algorithm-truncation selection. Using truncation selection, the engine 106 only selects uniformly at random from the top percentage of performers, thereby eliminating a fixed percentage of the weakest candidates.

However, with fitness proportionate selection there is a chance some weaker solutions (treatments) may survive the selection process. This is an advantage, because there is a chance that even weak solutions may have some features or characteristics which could prove useful following the recombination process.

Squared Score Approach

According to embodiments of the disclosure, the chosen reproduction operation is a crossover operation, and the engine 106 determines a treatment by selecting two or more sets of setpoints from a pool of setpoints based upon the probability of selecting the $i^{th}$ previous set of setpoints $P_i$. $P_i$ is based upon a square of the fitness score for the $i^{th}$ previous set of setpoints of the treatment applied to the control volume:

$$P_i = \frac{(score_i - score_{min})^2}{\sum (score_j - score_{min})^2}$$

where $score_i$=fitness score for the application of the $i^{th}$ previous set of setpoints of the $i^{th}$ previous treatment; in the summation the index j runs from 1 to M, where M is the number of sets of setpoints of M previous treatments, and $score_{min}$=minimum of the fitness scores for M previous sets of setpoints of M previous treatments.

While the squared score approach is not a typical method of cross breeding (crossover), it offers some benefits to this specific problem formulation:

The score function can take on a negative value. In practice, this may not have an impact for a simple response variable like harvest weight alone, but it allows the construction of synthetic responses that take into account loss or quality scoring in addition to harvest. For example, a saleable yield of 10 grams for a plant and 90% quality may be given a score of 10*90%=9.

Given the small number of treatments and generations, squaring forces selection and convergence. A conventional genetic algorithm running in more abstract contexts such as financial modeling and equipment design may run thousands of iterations/generations and converge on an acceptable solution relatively quickly (e.g., within a few minutes). However, a typical indoor agricultural experiment can take roughly two months to yield useful data. Squaring the fitness score can more rapidly achieve convergence.

Determining Treatment Recommendations for Elements of Different Granularity

Embodiments of the disclosure have access to several experimental grow spaces (e.g., pods). The conditions can be varied at different levels of granularity, with variables affecting multiple grow spaces, one grow space, or elements within a grow space such as individual multi-plant support structures (e.g., towers, tables, or trays) or a single plant within a multi-plant support structure. For example, environmental setpoints can be determined and applied to one tower within a pod, at a coarser level of granularity to all towers within a pod (e.g., to the entire pod), and at an even coarser granularity to a group of pods.

According to embodiments of the disclosure, the engine 106 can determine the treatment setpoints for the different granularities of spatial volumes asynchronously. According to embodiments of the disclosure, the engine 106 fixes (i.e., stops iteratively adjusting) one or more setpoints within a set of treatment setpoints to be applied to a control volume based on at least one tier-level termination condition. For example, the following tiers may have different tier-level terminations conditions: multi-plant support structures (e.g., towers) that are within the control volume, the control volumes (e.g., pods) themselves, or multiple control volumes. The tier termination condition may be based at least in part upon, e.g., a time duration of the treatment recommendation process, a number of iterations of the process, a setpoint (e.g., temperature) limit, fitness score variation limit (e.g., fitness score not varying more than a predefined percentage (e.g., 5%, 10%) over a predefined number or percentage (e.g., 10%, 20%) of the most recent iterations that have already been performed), or attainment of a target fitness score for one or more control volumes.

According to embodiments of the disclosure, the engine 106 can determine treatments first at a coarser granularity (914) and then at finer granularities (916), or vice versa, or in any order with respect to granularity. For example, the engine 106 can determine the setpoints for the pH and EC of water and for a nutrient mix applied to a cluster of pods, determine different temperature and $CO_2$ concentration setpoints on a per-pod basis, and determine moisture per seed plug on a per-tower basis.

According to embodiments of the disclosure, the engine 106 can end its determination of treatments for a particular granularity tier after achieving a corresponding tier termination condition before starting determination of treatments for another tier, or can determine treatments for more than one tier during at least partially overlapping time periods (iterations), but stop treatment determination for one tier at a different time/iteration than for another tier based on their corresponding tier termination conditions. At each iteration, after determining the treatment to be applied, the engine 106 can instruct the grow space control system 103 directly (e.g., via an API) to apply the recommended setpoints, or a human operator may do so via the interface 104.

According to embodiments of the disclosure, in recommending the treatments to be applied to a particular tier (e.g., pod, plant within a tower, tower within a pod, cluster of pods), the engine 106 uses a fitness score that is a function of the environmental conditions measured at one or more (e.g., all) tier levels. Using the example above, the scoring module 110 measures via sensors (and the engine 106 sets the setpoints) for the pH and EC of water of a cluster of pods, temperature and $CO_2$ concentration on a per-pod basis, seed density on a per tower basis, and plant size and mass on a per-plant basis.

As time can be a varying parameter, the algorithm for the different tiers may be started and stopped out of sync, thus achieving a maximally efficient schedule to minimize wasted time and resources (e.g., empty pods running no experimental treatment).

Referring to FIG. 8, according to embodiments of the disclosure, the engine 106 determines both coarse and fine setpoints for a treatment (set of setpoints) during the same iteration. According to embodiments of the disclosure, the engine 106 first determines recommendations for coarse granularity setpoints and then for fine granularity setpoints within the same iteration. According to embodiments of the disclosure, over multiple iterations, the engine 106 stops determining the coarse setpoints, thus fixing them for the treatment set of setpoints for subsequent iterations, but continues to determine the fine setpoints of the treatment set of setpoints for the later iterations.

According to embodiments of the disclosure, as an example, the engine 106 may adjust the setpoints for the coarser (e.g., pod-level) granularity during each iteration until an iteration in which a coarse tier (pod-level) termination condition is satisfied (e.g., stop adjusting pod-level setpoints after 20 iterations), but continue to adjust the setpoints at each iteration for the finer granularity, smaller size towers until a fine tier termination condition is satisfied (e.g., a desired harvest weight is achieved). Note that if the algorithm only deals with two granularity tiers, the fine tier termination condition may be the same as the termination condition for the entire experiment set.

For example, assume a treatment comprises temperature (T) and humidity (H) for a pod, and nutrient pH and EC for each tower (pH, EC). A treatment for the $i^{th}$ iteration may thus be represented by the set of setpoints $(T_i, H_i, pH_i, EC_i)$. According to embodiments of the disclosure, if the engine 106 chooses a random reproduction operation (950), the engine 106 randomly selects T and H (954) and pH and EC (956) during each iteration until a coarse tier termination condition reaches, for example, 20 iterations (after the initial seeding stage), after which the engine 106 sets T and H, but continues randomly selecting pH and EC (956) until a termination condition is reached for the optimization algorithm (e.g., desired harvest weight achieved).

The progression of recommendations for this example may be represented as follows:

$(T_1, H_1, pH_1, EC_1)$
$(T_2, H_2, pH_2, EC_2)$
. . .
$(T_{19}, H_{19}, pH_{19}, EC_{19})$
$(T_{20}, H_{20}, pH_{20}, EC_{20})$—$20^{th}$ iteration
$(T_{20}, H_{20}, pH_{21}, EC_{21})$
$(T_{20}, H_{20}, pH_{22}, EC_{22})$
$(T_{20}, H_{20}, pH_{23}, EC_{23})$
. . .
$(T_{20}, H_{20}, pH_x, EC_x)$ where subscript "x" represents the iteration at which the fine termination condition is reached.

Similarly, if the engine 106 chooses a crossover reproduction operation (950), the engine 106 selects two previous treatments (958) during an iteration, and selects two subsets of coarse, pod-level setpoints (T, H) from the two previous treatments for a crossover operation (960) to determine the subset (T, H) to be recommended during that iteration for the treatment. From the selected two previous treatments or from a new selection of two previous treatments (962), the engine 106 selects two subsets of fine, tower-level setpoints (pH, EC) for a crossover operation (964) to determine the subset (pH, EC) to be recommended along with the determined subset (T, H) for the treatment (T, H, pH, EC) to be recommended during the iteration.

In the example of FIG. 8, replication does not depend upon granularity. Thus, if the engine 106 chooses a replication reproduction operation, the engine may randomly select a previous treatment to recommended again for the iteration (966).

Adjusting Reproduction Proportions and Fitness Thresholds

According to embodiments of the disclosure, for at least two iterations for a control volume, the engine 106 adjusts the reproduction proportions. As explained elsewhere herein, in some embodiments, the reproduction proportion for each operation is the same as the corresponding fitness threshold; e.g., the reproduction proportion for a replication operation is the same as the replication threshold, and the reproduction proportion for a modification operation is the same as the modification threshold.

As an example, the engine 106 may initially set the reproduction proportions to randomize the treatment setpoints, and over time adjust the proportions to a target distribution of proportions over the different reproduction operations (e.g., replication, modification, random). Intuitively, in the beginning one would like a high percentage of random operations in order to explore the space in an unbiased way, but as it continues one would like a greater percentage of the experimental treatments to be informed by their predecessors' successes. The adjustments may be changed before each iteration at a "learning rate." The table below shows adjustments made at a learning rate of 0.1 from all-random reproduction operations to a target 10%/80%/10% replication/modification/random distribution.

According to embodiments of the disclosure, the adjustment function modifies the reproduction proportion RP for each operation (e.g., replication, modification) by the learning rate LR by adding to RP an update increment based on the learning rate, and normalizing the intermediate result, according to the following equation:

$RP_{j,i+1} = (RP_{j,i} + LR*RP_{j,target})/$(total of RPs for all 3 operations j for the $i^{th}$ iteration)

$$RP_{j,i+1} = \frac{RP_{j,i} + LR * RP_{j,target}}{\sum_k RP_{k,i} + LR * RP_{k,target}}$$

where i is the iteration number, j is the operation type (e.g., replication, modification, or random), k is the summation index and runs from 1 to 3 for each of the three possible operation types, $RP_{j,target}$ is the target reproduction proportion for the jth operation type, and $LR*RP_{j,target}$ is the update increment in this example.

| Iteration | Replication | Modification | Random |
|---|---|---|---|
| 1 | 0 | 0 | 1 |
| 2 | 0.00909 | 0.0727 | 0.918 |
| 3 | 0.0174 | 0.139 | 0.844 |
| 4 | 0.0249 | 0.199 | 0.776 |
| . . . | . . . | . . . | . . . |
| N → ∞ | .1 | .8 | .1 |

According to embodiments of the disclosure, the modification and replication thresholds are adjusted in the same manner as RP. According to embodiments of the disclosure, those thresholds are adjusted in the same manner as RP, but with different learning rates than RP.

Genetic Algorithm Method Advantages

To compare methods, simulations were run 1,000 times for both the exhaustive method and for the genetic algorithm with the roulette wheel and the squared score approaches. The number of pods per plant variety considered for GA were 5, 10, 15, 20, 25, 30, 35, 40, 45, and 50.

The simulations provided different outcomes depending on the number of pods.

Figure 5:
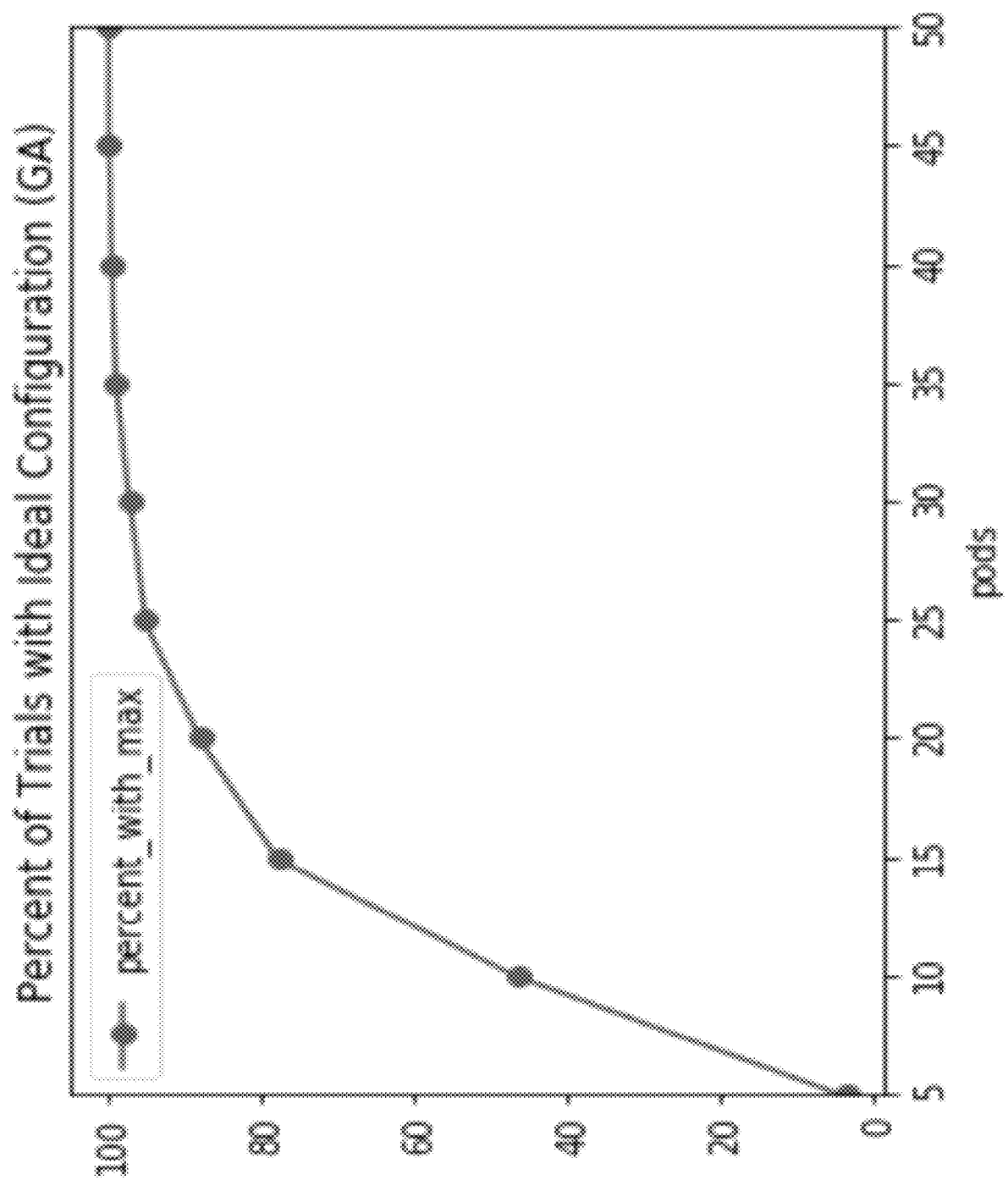
FIG. 5 plots percentage of theoretically ideal performance of a plant variety in response to treatments determined by embodiments of the disclosure vs. the number of pods used in the experiments.

FIG. 5 plots percentage of theoretically ideal performance of a plant variety in response to treatments determined by embodiments of the disclosure vs. the number of pods used in the experiments. The marginal value of an added grow space begins diminishing quickly after 20 pods per variety. To provide a comparison to the exhaustive approach consider that, at the 25 pods configuration, the genetic algorithm approach found the theoretically ideal configuration in 99% of the simulations.

Assuming each variety has its own pod, 150 pods managed via genetic algorithm would be required to achieve a slight gain in improvement over the 224 pods required for an exhaustive approach, representing roughly a 33% reduction in required number of pods. This may be further reduced if one can construct groups of "like" varieties that are expected to respond broadly and roughly in the same way to changes in environment.

As one increases the number of treatments, the number of pods required grows exponentially for the exhaustive method, while early data indicates that the number of pods grows sub-exponentially for the genetic algorithm method. In other words, the genetic algorithm can help cope with an increased number of treatments a lot more easily than the traditional empirical method.

Another advantage of this approach over an exhaustive one is that noise and variability in outcome is less likely to negatively impact final results and recommendations of this algorithm. In particular, in a space that is very noisy and variable (such as agriculture, where plant outcomes have a high degree of natural variability), the genetic approach has built-in replicate and crossover experimental treatments to allow more data collection in areas that seem promising. Compared to an exhaustive approach, where each and every treatment must be tried enough to gain confidence that a reading is not anomalous, the genetic approach automatically retries experimental treatments commensurate with their promise and does not require the same level of exhaustive treatment replication.

Machine Learning

Embodiments of the disclosure may apply machine learning ("ML") techniques to learn the relationship between the given parameters (e.g., environmental conditions such as temperature, humidity) and observed outcomes (e.g., experimental data concerning yield and energy consumption). Embodiments of the disclosure employ genetic algorithms to rapidly converge on setpoints for environmental treatments. Embodiments may use ML models, e.g., Decision Trees, to determine feature importance. In general, machine learning may be described as the optimization of performance criteria, e.g., parameters, techniques or other features, in the performance of an informational task (such as classification or regression) using a limited number of examples of labeled data, and then performing the same task on unknown data. In supervised machine learning such as an approach employing linear regression, the machine (e.g., a computing device) learns, for example, by identifying patterns, categories, statistical relationships, or other attributes exhibited by training data. The result of the learning is then used to predict whether new data will exhibit the same patterns, categories, statistical relationships or other attributes.

Embodiments of this disclosure may employ unsupervised machine learning. Alternatively, some embodiments may employ semi-supervised machine learning, using a small amount of labeled data and a large amount of unlabeled data. Embodiments may also employ feature selection to select the subset of the most relevant features to optimize performance of the machine learning model. Depending upon the type of machine learning approach selected, as alternatives or in addition to linear regression, embodiments may employ for example, logistic regression, neural networks, support vector machines (SVMs), decision trees, hidden Markov models, Bayesian networks, Gram Schmidt, reinforcement-based learning, cluster-based learning including hierarchical clustering, genetic algorithms, and any other suitable learning machines known in the art. In particular, embodiments may employ logistic regression to provide probabilities of classification along with the classifications themselves.

Embodiments may employ graphics processing unit (GPU) or Tensor processing units (TPU) accelerated architectures that have found increasing popularity in performing machine learning tasks, particularly in the form known as deep neural networks (DNN). Embodiments of the disclosure may employ GPU-based machine learning, such as that described in GPU-Based Deep Learning Inference: A Performance and Power Analysis, NVidia Whitepaper, November 2015, Dahl, et al., which is incorporated by reference in its entirety herein.

Computer System Implementation

Figure 6:
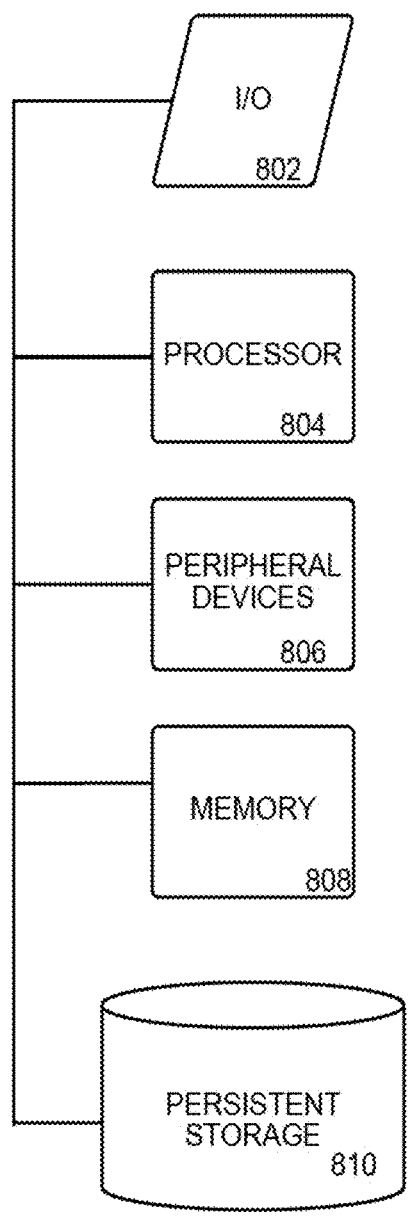
FIG. 6 illustrates an example of a computer system that may be used to execute program code stored in a non-transitory computer readable medium (e.g., memory) in accordance with embodiments of the disclosure.

FIG. 6 illustrates an example of a computer system 800 that may be used to execute program code stored in a non-transitory computer readable medium (e.g., memory) in accordance with embodiments of the disclosure. The computer system includes an input/output subsystem 802, which may be used to interface with human users or other computer systems depending upon the application. The I/O subsystem 802 may include, e.g., a keyboard, mouse, graphical user interface, touchscreen, or other interfaces for input, and, e.g., an LED or other flat screen display, or other interfaces for output, including application program interfaces (APIs). Other elements of embodiments of the disclosure, such as engine 106, controller 203, and control system 103, may be implemented with a computer system like that of computer system 800.

Program code may be stored in non-transitory media such as persistent storage in secondary memory 810 or main memory 808 or both. Main memory 808 may include volatile memory such as random access memory (RAM) or non-volatile memory such as read only memory (ROM), as well as different levels of cache memory for faster access to instructions and data. Secondary memory may include persistent storage such as solid state drives, hard disk drives or optical disks. One or more processors 804 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 804. The processor(s) 804 may include graphics processing units (GPUs) for handling computationally intensive tasks.

The processor(s) 804 may communicate with external networks via one or more communications interfaces 807, such as a network interface card, WiFi transceiver, etc. A bus 805 communicatively couples the I/O subsystem 802, the processor(s) 804, peripheral devices 806, communications interfaces 807, memory 808, and persistent storage 810. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 800. In particular, the elements of automated systems or devices described herein may be computer-implemented. Some elements and functionality may be implemented locally and others may be implemented in a distributed fashion over a network through different servers, e.g., in client-server fashion, for example.

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

Those skilled in the art will recognize that, in some embodiments, some of the operations described herein may be performed by human implementation, or through a combination of automated and manual means. When an operation is not fully automated, appropriate components of embodiments of the disclosure may, for example, receive the results of human performance of the operations rather than generate results through its own operational capabilities.

All references, articles, publications, patents, patent publications, and patent applications cited herein are incorporated by reference in their entireties for all purposes to the extent they are not inconsistent with embodiments of the disclosure expressly described herein. However, mention of any reference, such as an article, publication, patent, patent publication, or patent application cited herein is not, and should not be taken as an acknowledgment or suggestion that the reference constitutes valid prior art or forms part of the common general knowledge in any country in the world, or that it discloses essential matter.

Selected Embodiments of the Disclosure

Each embodiment below corresponds to one or more embodiments of the disclosure. Dependencies below refer back to embodiments within the same set of embodiments.

Method Embodiment Set

1. A computer-implemented method for determining treatments to apply to one or more plants within each control volume of one or more control volumes having a controlled agricultural environment, wherein each treatment comprises application of a set of setpoints to a control volume, the method comprising:
    for each control volume of the one or more control volumes during each iteration of a plurality of iterations, one or more processors:
    a. choose, from a plurality of reproduction operations, a reproduction operation for a treatment to be applied to the control volume; and
    b. determine the treatment to be applied to the control volume based at least in part upon one or more previous sets of setpoints, for use with the reproduction operation chosen for the current iteration, wherein the one or more previous sets of setpoints are selected from one or more previous treatments that were applied to the one or more control volumes.
2. The method of embodiment 1, wherein the one or more previous sets of setpoints are selected from the previous treatments that were applied to all of the one or more control volumes.
3. The method of embodiment 1, wherein the chosen reproduction operation comprises a replication operation or a modification operation.
4. The method of embodiment 3, wherein the modification operation is at least one of a crossover operation or a mutation operation.
5. The method of embodiment 1, wherein the chosen reproduction operation comprises at least one of a crossover operation or a mutation operation.
6. The method of embodiment 1, wherein choosing a reproduction operation comprises choosing a reproduction operation from a plurality of reproduction operations in proportion to a reproduction proportion.
7. The method of embodiment 1, wherein the reproduction operation comprises a crossover operation and determining a treatment is based at least in part upon a genetic algorithm to select two of more previous sets of setpoints for the crossover operation.
8. The method of embodiment 1, wherein determining a treatment is based at least in part upon one or more fitness scores of the one or more previous treatments.
9. The method of embodiment 8, wherein the one or more fitness scores are based at least in part upon harvest weight, cost, or an energy-related metric.
10. The method of embodiment 1, wherein determining a treatment comprises selecting one or more previous sets of setpoints from the one or more previous treatments that each has a corresponding fitness score that satisfies a fitness threshold.
11. The method of embodiment 1, wherein determining a treatment comprises selecting one or more previous sets of setpoints from the one or more previous treatments based at least in part upon fitness proportionate selection.
12. The method of embodiment 1, wherein determining a treatment comprises randomly selecting one or more previous sets of setpoints.
13. The method of embodiment 1, wherein the chosen reproduction operation is a replication operation, and determining a treatment comprises selecting a previous set of setpoints from the previous treatments that each have a fitness score that satisfies a replication threshold.
14. The method of embodiment 13, further comprising, for at least two subsequent iterations for a control volume, adjusting the replication threshold.
15. The method of embodiment 1, wherein the chosen reproduction operation is a modification operation, and determining a treatment comprises selecting previous sets of setpoints from the previous treatments that each have a fitness score that satisfies a modification threshold.
16. The method of embodiment 15, further comprising, for at least two subsequent iterations for a control volume, adjusting the modification threshold.
17. The method of embodiment 1, further comprising repeating a.-b. until a termination condition is satisfied.
18. The method of embodiment 1, wherein the determined treatment for each iteration corresponds to a determined set of setpoints, of the one or more previous sets of setpoints, to be applied to the control volume, the method further comprising repeating a.-b. to determine one or more first setpoints of the determined set of setpoints until a tier-level termination condition is satisfied for the one or more first setpoints, and thereafter repeating a.-b. to determine one or more second setpoints of the determined set of setpoints.
19. The method of embodiment 1, wherein the determined treatment for each iteration corresponds to a determined set of setpoints, of the one or more previous sets of setpoints, to be applied to the control volume, one or more first setpoints of the determined set of setpoints are setpoints applicable to the control volume, and one or more second setpoints of the determined set of setpoints are setpoints applicable to one or more multi-plant support structures within the control volume but not to the entire control volume itself.
20. The method of embodiment 17, wherein the termination condition is based at least in part upon time, number of iterations, limit of one or more setpoints, fitness score variation limit, or attainment of a target fitness score.
21. The method of embodiment 1, wherein each control volume includes one or more plants of the same variety.
22. The method of embodiment 1, wherein the start time of the $i^{th}$ iteration for one control volume does not necessarily coincide with the start time of the $i^{th}$ iteration for another control volume.
23. The method of embodiment 1, wherein the chosen reproduction operation is a crossover operation, and determining a treatment comprises selecting at least two previous sets of setpoints based at least in part upon a probability of selection, $P_i$, wherein $P_i$ is based at least in part upon a square of a fitness score for the $i^{th}$ previous set of setpoints of a previous treatment.
24. The method of embodiment 1, further comprising, for at least two subsequent iterations for a control volume, adjusting the reproduction proportion.
25. The method of embodiment 1, wherein the treatments include one or more of light spectrum, light intensity, light duration, $CO_2$ concentration, air temperature, humidity, nutrient solution EC, or nutrient solution pH.
26. The method of embodiment 1, further comprising applying the determined treatment to the control volume.
27. The method of embodiment 1, further comprising for the current iteration, choosing a second reproduction operation from the plurality of reproduction operations to determine the treatment to be applied to the control volume.
28. The method of embodiment 1, wherein the one or more control volumes are grow spaces used for experimental purposes, and the determined treatment is applied to at least one of the one or more control volumes.
29. The method of embodiment 1, wherein, after a termination condition is reached, the determined treatment is applied to a production control volume that is a plant grow space used for production purposes.
30. The method of any one of the preceding embodiments, wherein the previous sets of setpoints are based at least in part upon measured setpoint values.
31. The method of embodiment 8, wherein the one or more fitness scores is based at least in part upon plant quality.

System Embodiment Set

1. A system for determining treatments to apply to one or more plants within each control volume of one or more control volumes having a controlled agricultural environment, wherein each treatment comprises application of a set of setpoints to a control volume, the system comprising:
   one or more processors; and
   one or more memories coupled to the one or more processors and storing instructions, that when executed by at least one of the one or more processors, cause the system to:
      for each control volume of the one or more control volumes during each iteration of a plurality of iterations:
         a. choose, from a plurality of reproduction operations, a reproduction operation for a treatment to be applied to the control volume; and
         b. determine the treatment to be applied to the control volume based at least in part upon one or more previous sets of setpoints, for use with the reproduction operation chosen for the current iteration, wherein the one or more previous sets of setpoints are selected from one or more previous treatments that were applied to the one or more control volumes.
2. The system of embodiment 1, wherein the one or more previous sets of setpoints are selected from the previous treatments that were applied to all of the one or more control volumes.
3. The system of embodiment 1, wherein the chosen reproduction operation comprises a replication operation or a modification operation.
4. The system of embodiment 3, wherein the modification operation is at least one of a crossover operation or a mutation operation.
5. The system of embodiment 1, wherein the chosen reproduction operation comprises at least one of a crossover operation or a mutation operation.
6. The system of embodiment 1, wherein choosing a reproduction operation comprises choosing a reproduction operation from a plurality of reproduction operations in proportion to a reproduction proportion.
7. The system of embodiment 1, wherein the reproduction operation comprises a crossover operation and determining a treatment is based at least in part upon a genetic algorithm to select two of more previous sets of setpoints for the crossover operation.
8. The system of embodiment 1, wherein determining a treatment is based at least in part upon one or more fitness scores of the one or more previous treatments.
9. The system of embodiment 8, wherein the one or more fitness scores are based at least in part upon harvest weight, cost, or an energy-related metric.
10. The system of embodiment 1, wherein determining a treatment comprises selecting one or more previous sets of setpoints from the one or more previous treatments that each has a corresponding fitness score that satisfies a fitness threshold.
11. The system of embodiment 1, wherein determining a treatment comprises selecting one or more previous sets of setpoints from the one or more previous treatments based at least in part upon fitness proportionate selection.
12. The system of embodiment 1, wherein determining a treatment comprises randomly selecting one or more previous sets of setpoints.
13. The system of embodiment 1, wherein the chosen reproduction operation is a replication operation, and determining a treatment comprises selecting a previous set of setpoints from the previous treatments that each have a fitness score that satisfies a replication threshold.
14. The system of embodiment 13, wherein the one or more memories store further instructions that, when executed, cause the system to, for at least two subsequent iterations for a control volume, adjust the replication threshold.
15. The system of embodiment 1, wherein the chosen reproduction operation is a modification operation, and determining a treatment comprises selecting previous sets of setpoints from the previous treatments that each have a fitness score that satisfies a modification threshold.
16. The system of embodiment 15, wherein the one or more memories store further instructions that, when executed, cause the system to, for at least two subsequent iterations for a control volume, adjust the modification threshold.

17. The system of embodiment 1, wherein the one or more memories store further instructions that, when executed, cause the system to repeat a.-b. until a termination condition is satisfied.
18. The system of embodiment 1, wherein the determined treatment for each iteration corresponds to a determined set of setpoints, of the one or more previous sets of setpoints, to be applied to the control volume,
    wherein the one or more memories store further instructions that, when executed, cause the system to repeat a.-b. to determine one or more first setpoints of the determined set of setpoints until a tier-level termination condition is satisfied for the one or more first setpoints, and thereafter repeat a.-b. to determine one or more second setpoints of the determined set of setpoints.
19. The system of embodiment 1, wherein the determined treatment for each iteration corresponds to a determined set of setpoints, of the one or more previous sets of setpoints, to be applied to the control volume, one or more first setpoints of the determined set of setpoints are setpoints applicable to the control volume, and one or more second setpoints of the determined set of setpoints are setpoints applicable to one or more multi-plant support structures within the control volume but not to the entire control volume itself
20. The system of embodiment 17, wherein the termination condition is based at least in part upon time, number of iterations, limit of one or more setpoints, fitness score variation limit, or attainment of a target fitness score.
21. The system of embodiment 1, wherein each control volume includes one or more plants of the same variety.
22. The system of embodiment 1, wherein the start time of the $i^{th}$ iteration for one control volume does not necessarily coincide with the start time of the $i^{th}$ iteration for another control volume.
23. The system of embodiment 1, wherein the chosen reproduction operation is a crossover operation, and determining a treatment comprises selecting at least two previous sets of setpoints based at least in part upon a probability of selection, $P_i$, wherein $P_i$ is based at least in part upon a square of a fitness score for the $i^{th}$ previous set of setpoints of a previous treatment.
24. The system of embodiment 1, wherein the one or more memories store further instructions that, when executed, cause the system to, for at least two subsequent iterations for a control volume, adjust the reproduction proportion.
25. The system of embodiment 1, wherein the treatments include one or more of light spectrum, light intensity, light duration, $CO_2$ concentration, air temperature, humidity, nutrient solution EC, or nutrient solution pH.
26. The system of embodiment 1, wherein the one or more memories store further instructions that, when executed, cause the system to apply the determined treatment to the control volume.
27. The system of embodiment 1, wherein the one or more memories store further instructions that, when executed, cause the system to, for the current iteration, choose a second reproduction operation from the plurality of reproduction operations to determine the treatment to be applied to the control volume.
28. The system of embodiment 1, wherein the one or more control volumes are grow spaces used for experimental purposes, and the determined treatment is applied to at least one of the one or more control volumes.
29. The system of embodiment 1, wherein, after a termination condition is reached, the determined treatment is applied to a production control volume that is a plant grow space used for production purposes.
30. The system of any one of the preceding embodiments, wherein the previous sets of setpoints are based at least in part upon measured setpoint values.
31. The system of embodiment 8, wherein the one or more fitness scores is based at least in part upon plant quality.

Computer-Readable Media Embodiment Set

1. One or more non-transitory computer-readable media storing instructions for determining treatments to apply to one or more plants within each control volume of one or more control volumes having a controlled agricultural environment, wherein each treatment comprises application of a set of setpoints to a control volume, wherein the instructions, when executed by one or more computing devices, cause at least one of the one or more computing devices to:
    for each control volume of the one or more control volumes during each iteration of a plurality of iterations:
    a. choose, from a plurality of reproduction operations, a reproduction operation for a treatment to be applied to the control volume; and
    b. determine the treatment to be applied to the control volume based at least in part upon one or more previous sets of setpoints, for use with the reproduction operation chosen for the current iteration, wherein the one or more previous sets of setpoints are selected from one or more previous treatments that were applied to the one or more control volumes.
2. The one or more non-transitory computer-readable media of embodiment 1, wherein the one or more previous sets of setpoints are selected from the previous treatments that were applied to all of the one or more control volumes.
3. The one or more non-transitory computer-readable media of embodiment 1, wherein the chosen reproduction operation comprises a replication operation or a modification operation.
4. The one or more non-transitory computer-readable media of embodiment 3, wherein the modification operation is at least one of a crossover operation or a mutation operation.
5. The one or more non-transitory computer-readable media of embodiment 1, wherein the chosen reproduction operation comprises at least one of a crossover operation or a mutation operation.
6. The one or more non-transitory computer-readable media of embodiment 1, wherein choosing a reproduction operation comprises choosing a reproduction operation from a plurality of reproduction operations in proportion to a reproduction proportion.
7. The one or more non-transitory computer-readable media of embodiment 1, wherein the reproduction operation comprises a crossover operation and determining a treatment is based at least in part upon a genetic algorithm to select two of more previous sets of setpoints for the crossover operation.
8. The one or more non-transitory computer-readable media of embodiment 1, wherein determining a treatment is based at least in part upon one or more fitness scores of the one or more previous treatments.
9. The one or more non-transitory computer-readable media of embodiment 8, wherein the one or more fitness scores are based at least in part upon harvest weight, cost, or an energy-related metric.

10. The one or more non-transitory computer-readable media of embodiment 1, wherein determining a treatment comprises selecting one or more previous sets of setpoints from the one or more previous treatments that each has a corresponding fitness score that satisfies a fitness threshold.

11. The one or more non-transitory computer-readable media of embodiment 1, wherein determining a treatment comprises selecting one or more previous sets of setpoints from the one or more previous treatments based at least in part upon fitness proportionate selection.

12. The one or more non-transitory computer-readable media of embodiment 1, wherein determining a treatment comprises randomly selecting one or more previous sets of setpoints.

13. The one or more non-transitory computer-readable media of embodiment 1, wherein the chosen reproduction operation is a replication operation, and determining a treatment comprises selecting a previous set of setpoints from the previous treatments that each have a fitness score that satisfies a replication threshold.

14. The one or more non-transitory computer-readable media of embodiment 13, storing further instructions that, when executed, cause at least one of the one or more computing devices to, for at least two subsequent iterations for a control volume, adjust the replication threshold.

15. The one or more non-transitory computer-readable media of embodiment 1, wherein the chosen reproduction operation is a modification operation, and determining a treatment comprises selecting previous sets of setpoints from the previous treatments that each have a fitness score that satisfies a modification threshold.

16. The one or more non-transitory computer-readable media of embodiment 15, storing further instructions that, when executed, cause at least one of the one or more computing devices to, for at least two subsequent iterations for a control volume, adjust the modification threshold.

17. The one or more non-transitory computer-readable media of embodiment 1, storing further instructions that, when executed, cause at least one of the one or more computing devices to repeat a.-b. until a termination condition is satisfied.

18. The one or more non-transitory computer-readable media of embodiment 1, wherein the determined treatment for each iteration corresponds to a determined set of setpoints, of the one or more previous sets of setpoints, to be applied to the control volume, the computer-readable media storing further instructions that, when executed, cause at least one of the one or more computing devices to repeat a.-b. to determine one or more first setpoints of the determined set of setpoints until a tier-level termination condition is satisfied for the one or more first setpoints, and thereafter repeat a.-b. to determine one or more second setpoints of the determined set of setpoints.

19. The one or more non-transitory computer-readable media of embodiment 1, wherein the determined treatment for each iteration corresponds to a determined set of setpoints, of the one or more previous sets of setpoints, to be applied to the control volume, one or more first setpoints of the determined set of setpoints are setpoints applicable to the control volume, and one or more second setpoints of the determined set of setpoints are setpoints applicable to one or more multi-plant support structures within the control volume but not to the entire control volume itself.

20. The one or more non-transitory computer-readable media of embodiment 17, wherein the termination condition is based at least in part upon time, number of iterations, limit of one or more setpoints, fitness score variation limit, or attainment of a target fitness score.

21. The one or more non-transitory computer-readable media of embodiment 1, wherein each control volume includes one or more plants of the same variety.

22. The one or more non-transitory computer-readable media of embodiment 1, wherein the start time of the $i^{th}$ iteration for one control volume does not necessarily coincide with the start time of the $i^{th}$ iteration for another control volume.

23. The one or more non-transitory computer-readable media of embodiment 1, wherein the chosen reproduction operation is a crossover operation, and determining a treatment comprises selecting at least two previous sets of setpoints based at least in part upon a probability of selection, $P_i$, wherein $P_i$ is based at least in part upon a square of a fitness score for the $i^{th}$ previous set of setpoints of a previous treatment.

24. The one or more non-transitory computer-readable media of embodiment 1, storing further instructions that, when executed, cause at least one of the one or more computing devices to, for at least two subsequent iterations for a control volume, adjust the reproduction proportion.

25. The one or more non-transitory computer-readable media of embodiment 1, wherein the treatments include one or more of light spectrum, light intensity, light duration, $CO_2$ concentration, air temperature, humidity, nutrient solution EC, or nutrient solution pH.

26. The one or more non-transitory computer-readable media of embodiment 1, storing further instructions that, when executed, cause at least one of the one or more computing devices to apply the determined treatment to the control volume.

27. The one or more non-transitory computer-readable media of embodiment 1, storing further instructions that, when executed, cause at least one of the one or more computing devices to, for the current iteration, choose a second reproduction operation from the plurality of reproduction operations to determine the treatment to be applied to the control volume.

28. The one or more non-transitory computer-readable media of embodiment 1, wherein the one or more control volumes are grow spaces used for experimental purposes, and the determined treatment is applied to at least one of the one or more control volumes.

29. The one or more non-transitory computer-readable media of embodiment 1, wherein, after a termination condition is reached, the determined treatment is applied to a production control volume that is a plant grow space used for production purposes.

30. The one or more non-transitory computer-readable media of any one of the preceding embodiments, wherein the previous sets of setpoints are based at least in part upon measured setpoint values.

31. The one or more non-transitory computer-readable media of embodiment 8, wherein the one or more fitness scores is based at least in part upon plant quality.

What is claimed is:

1. A method for determining treatments to apply to one or more plants within each control volume of one or more control volumes having a controlled agricultural environment, wherein each treatment comprises application of a set of setpoints to a control volume, and the one or more control volumes include a first control volume and a second control volume, the method comprising:

for each control volume of the one or more control volumes during each iteration of a plurality of iterations, one or more processors:
 a. choose, from a plurality of reproduction operations, a reproduction operation for a treatment to be applied to the control volume;
 b. determine the treatment to be applied to the control volume based at least in part upon one or more previous sets of setpoints, for use with the reproduction operation chosen for the current iteration, wherein the one or more previous sets of setpoints are selected from one or more previous treatments that were applied to the one or more control volumes; and
 c. repeat a.-b. until a termination condition is satisfied for the control volume,
 d. wherein an experiment for the control volume comprises: b. the determination of treatments to be applied to a control volume, and c. repeating a.-b. until satisfaction of a termination condition; and before a termination condition is satisfied for the first control volume, start a new experiment for the second control volume based at least in part upon the last determined treatment for the first control volume.

2. A system for determining treatments to apply to one or more plants within each control volume of one or more control volumes having a controlled agricultural environment, wherein each treatment comprises application of a set of setpoints to a control volume, and the one or more control volumes include a first control volume, a second control volume and a third control volume, the system comprising:

one or more memories storing instructions; and
one or more processors, coupled to the one or more memories, for executing the instructions to cause the system to:
 for each control volume of the one or more control volumes during each iteration of a plurality of iterations:
  a. choose, from a plurality of reproduction operations, a reproduction operation for a treatment to be applied to the control volume;
  b. determine the treatment to be applied to the control volume based at least in part upon one or more previous sets of setpoints, for use with the reproduction operation chosen for the current iteration, wherein the one or more previous sets of setpoints are selected from one or more previous treatments that were applied to the one or more control volumes; and
  c. repeat a.-b. until a termination condition is satisfied for the control volume,
  d. wherein an experiment for the control volume comprises: b. the determination of treatments to be applied to a control volume, and c. repeating a.-b. until satisfaction of a termination condition, and wherein, before a termination condition is satisfied for the first control volume, a new experiment for the second control volume is started based at least in part upon the last determined treatment for the first control volume.

3. One or more non-transitory computer-readable media storing instructions for determining treatments to apply to one or more plants within each control volume of one or more control volumes having a controlled agricultural environment, wherein each treatment comprises application of a set of setpoints to a control volume, and the one or more control volumes include a first control volume and a second control volume, wherein the instructions, when executed by one or more computing devices, cause at least one of the one or more computing devices to:
 for each control volume of the one or more control volumes during each iteration of a plurality of iterations:
  a. choose, from a plurality of reproduction operations, a reproduction operation for a treatment to be applied to the control volume;
  b. determine the treatment to be applied to the control volume based at least in part upon one or more previous sets of setpoints, for use with the reproduction operation chosen for the current iteration, wherein the one or more previous sets of setpoints are selected from one or more previous treatments that were applied to the one or more control volumes; and
  c. repeat a.-b. until a termination condition is satisfied for the control volume,
  d. wherein an experiment for the control volume comprises: b. the determination of treatments to be applied to a control volume, and c. repeating a.-b. until satisfaction of a termination condition, and wherein, before a termination condition is satisfied for the first control volume, a new experiment for the second control volume is started based at least in part upon the last determined treatment for the first control volume.

4. The one or more non-transitory computer-readable media of claim 3, wherein the one or more previous sets of setpoints are selected from the previous treatments that were applied to all of the one or more control volumes.

5. The one or more non-transitory computer-readable media of claim 3, wherein the chosen reproduction operation comprises a replication operation or a modification operation.

6. The one or more non-transitory computer-readable media of claim 5, wherein the modification operation is at least one of a crossover operation or a mutation operation.

7. The one or more non-transitory computer-readable media of claim 3, wherein the chosen reproduction operation comprises at least one of a crossover operation or a mutation operation.

8. The one or more non-transitory computer-readable media of claim 3, wherein choosing a reproduction operation comprises choosing a reproduction operation from a plurality of reproduction operations in proportion to a reproduction proportion.

9. The one or more non-transitory computer-readable media of claim 3, wherein the reproduction operation comprises a crossover operation and determining a treatment is based at least in part upon a genetic algorithm to select two or more previous sets of setpoints for the crossover operation.

10. The one or more non-transitory computer-readable media of claim 3, wherein determining a treatment is based at least in part upon one or more fitness scores of the one or more previous treatments.

11. The one or more non-transitory computer-readable media of claim 10, wherein the one or more fitness scores are based at least in part upon harvest weight, cost, or an energy-related metric.

12. The one or more non-transitory computer-readable media of claim 3, wherein determining a treatment comprises selecting one or more previous sets of setpoints from the one or more previous treatments that each has a corresponding fitness score that satisfies a fitness threshold.

13. The one or more non-transitory computer-readable media of claim 3, wherein determining a treatment comprises selecting one or more previous sets of setpoints from the one or more previous treatments based at least in part upon fitness proportionate selection.

14. The one or more non-transitory computer-readable media of claim 3, wherein determining a treatment comprises randomly selecting one or more previous sets of setpoints.

15. The one or more non-transitory computer-readable media of claim 3, wherein the chosen reproduction operation is a replication operation, and determining a treatment comprises selecting a previous set of setpoints from the previous treatments that each have a fitness score that satisfies a replication threshold.

16. The one or more non-transitory computer-readable media of claim 15, storing further instructions that, when executed, cause at least one of the one or more computing devices to, for at least two subsequent iterations for a control volume, adjust the replication threshold.

17. The one or more non-transitory computer-readable media of claim 3, wherein the chosen reproduction operation is a modification operation, and determining a treatment comprises selecting previous sets of setpoints from the previous treatments that each have a fitness score that satisfies a modification threshold.

18. The one or more non-transitory computer-readable media of claim 17, storing further instructions that, when executed, cause at least one of the one or more computing devices to, for at least two subsequent iterations for a control volume, adjust the modification threshold.

19. The one or more non-transitory computer-readable media of claim 3, wherein the determined treatment for each iteration corresponds to a determined set of setpoints, of the one or more previous sets of setpoints, to be applied to the control volume, the computer-readable media storing further instructions that, when executed, cause at least one of the one or more computing devices to repeat a.-b. to determine one or more first setpoints of the determined set of setpoints until a tier-level termination condition is satisfied for the one or more first setpoints, and thereafter repeat a.-b. to determine one or more second setpoints of the determined set of setpoints.

20. The one or more non-transitory computer-readable media of claim 3, wherein the determined treatment for each iteration corresponds to a determined set of setpoints, of the one or more previous sets of setpoints, to be applied to the control volume, one or more first setpoints of the determined set of setpoints are setpoints applicable to the control volume, and one or more second setpoints of the determined set of setpoints are setpoints applicable to one or more multi-plant support structures within the control volume but not to the entire control volume itself.

21. The one or more non-transitory computer-readable media of claim 3, wherein the termination condition is based at least in part upon time, number of iterations, limit of one or more setpoints, fitness score variation limit, or attainment of a target fitness score.

22. The one or more non-transitory computer-readable media of claim 3, wherein each control volume includes one or more plants of the same variety.

23. The one or more non-transitory computer-readable media of claim 3, wherein the start time of an $i^{th}$ iteration for one control volume does not necessarily coincide with the start time of an $i^{th}$ iteration for another control volume.

24. The one or more non-transitory computer-readable media of claim 3, wherein the chosen reproduction operation is a crossover operation, and determining a treatment comprises selecting at least two previous sets of setpoints based at least in part upon a probability of selection, $P_i$, wherein $P_i$ is based at least in part upon a square of a fitness score for an $i^{th}$ previous set of setpoints of a previous treatment.

25. The one or more non-transitory computer-readable media of claim 8, storing further instructions that, when executed, cause at least one of the one or more computing devices to, for at least two subsequent iterations for a control volume, adjust the reproduction proportion.

26. The one or more non-transitory computer-readable media of claim 3, wherein the treatments include one or more of light spectrum, light intensity, light duration, $CO_2$ concentration, air temperature, humidity, nutrient solution EC, or nutrient solution pH.

27. The one or more non-transitory computer-readable media of claim 3, storing further instructions that, when executed, cause at least one of the one or more computing devices to apply the determined treatment to the control volume.

28. The one or more non-transitory computer-readable media of claim 3, storing further instructions that, when executed, cause at least one of the one or more computing devices to, for the current iteration, choose a second reproduction operation from the plurality of reproduction operations to determine the treatment to be applied to the control volume.

29. The one or more non-transitory computer-readable media of claim 3, wherein the one or more control volumes are grow spaces used for experimental purposes, and the determined treatment is applied to at least one of the one or more control volumes.

30. The one or more non-transitory computer-readable media of claim 3, wherein, after a termination condition is reached, the determined treatment is applied to a production control volume that is a plant grow space used for production purposes.

31. The one or more non-transitory computer-readable media of claim 3, wherein the one or more previous sets of setpoints are based at least in part upon measured setpoint values.

32. The one or more non-transitory computer-readable media of claim 10, wherein the one or more fitness scores is based at least in part upon plant quality.

33. One or more non-transitory computer-readable media storing instructions for determining treatments to apply to one or more plants within each control volume of one or more control volumes having a controlled agricultural environment, wherein each treatment comprises application of a set of setpoints to a control volume, and the one or more control volumes include a first control volume, a second control volume and a third control volume, wherein the instructions, when executed by one or more computing devices, cause at least one of the one or more computing devices to:

for each control volume of the one or more control volumes during each iteration of a plurality of iterations:
  a. choose, from a plurality of reproduction operations, a reproduction operation for a treatment to be applied to the control volume;
  b. determine the treatment to be applied to the control volume based at least in part upon one or more previous sets of setpoints, for use with the reproduction operation chosen for the current iteration, wherein the one or more previous sets of setpoints are selected from one or more previous treatments that were applied to the one or more control volumes; and
  c. repeat a.-b. until a termination condition is satisfied for the control volume,
  d. wherein an experiment for the control volume comprises: b. the determination of treatments to be applied to a control volume, and c. repeating a.-b. until satisfaction of a termination condition, and wherein, after termination conditions are satisfied for the first and second control volumes at a first time and a respective second time later than the first time, a new experiment is started for the second control volume based at least in part upon the last determined treatment for the first control volume before a termination condition for the third control volume is satisfied.

* * * * *